US009683150B2

(12) United States Patent
Tadokoro et al.

(10) Patent No.: US 9,683,150 B2
(45) Date of Patent: Jun. 20, 2017

(54) CURABLE COMPOSITION, ADHESIVE, METHOD OF PRODUCING FIBER-REINFORCED COMPOSITE MATERIAL, AND FIBER-REINFORCED COMPOSITE MATERIAL

(71) Applicant: Tokyo Ohka Kogyo Co., Ltd., Kawasaki-shi (JP)

(72) Inventors: Yoshinori Tadokoro, Kawasaki (JP); Hiroki Chisaka, Kawasaki (JP); Kunihiro Noda, Kawasaki (JP); Dai Shiota, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 37 days.

Patent file contains an affidavit/declaration under 37 CFR 1.130(b).

(21) Appl. No.: 14/636,428

(22) Filed: Mar. 3, 2015

(65) Prior Publication Data

US 2015/0252229 A1 Sep. 10, 2015

(30) Foreign Application Priority Data

Mar. 7, 2014 (JP) ................................ 2014-045668
Sep. 17, 2014 (JP) ................................ 2014-189390

(51) Int. Cl.

| | |
|---|---|
| ***C09J 173/02*** | (2006.01) |
| ***C09J 163/00*** | (2006.01) |
| ***C09J 163/04*** | (2006.01) |
| ***C09J 165/00*** | (2006.01) |
| ***C09J 167/00*** | (2006.01) |
| ***C09J 187/00*** | (2006.01) |
| ***C08G 59/40*** | (2006.01) |
| ***C08G 59/42*** | (2006.01) |
| ***C08G 59/50*** | (2006.01) |
| ***C08G 59/62*** | (2006.01) |
| *C08K 7/02* | (2006.01) |

(52) U.S. Cl.

CPC .......... *C09J 173/02* (2013.01); *C08G 59/405* (2013.01); *C08G 59/42* (2013.01); *C08G 59/5073* (2013.01); *C08G 59/62* (2013.01); *C09J 163/00* (2013.01); *C09J 163/04* (2013.01); *C09J 165/00* (2013.01); *C09J 167/00* (2013.01); *C09J 187/005* (2013.01); *C08K 7/02* (2013.01)

(58) Field of Classification Search

CPC ..................................................... C09J 173/02
See application file for complete search history.

(56) References Cited

U.S. PATENT DOCUMENTS

2014/0057515 A1* 2/2014 Suzuki ...................... C08J 5/24
442/65
2015/0338734 A1* 11/2015 Noda .................. C07D 233/60
430/270.1

FOREIGN PATENT DOCUMENTS

| | | | |
|---|---|---|---|
| CA | 2293067 | A1 | 6/2000 |
| JP | 2003-100562 | | 4/2003 |
| JP | 2014-006273 | A | 1/2014 |
| KR | 10-2012-0057677 | A | 6/2012 |

OTHER PUBLICATIONS

English machine translation of JP 2014-006273. Original Japanese document published Jan. 16, 2014. Translation printed Jun. 2, 2016.*

Office Action in Japanese Patent Application No. 2014-189390, mailed Nov. 10, 2015.

Database WPI Week 201301 Thomson Scientific, London, GB; AN 2012-G77725 XP002742726, Jun. 7, 2012.

Extended European search report in European Patent Application No. 15156656.9, dated Sep. 11, 2015.

* cited by examiner

*Primary Examiner* — Megan McCulley
(74) *Attorney, Agent, or Firm* — Knobbe Martens Olson & Bear LLP

(57) ABSTRACT

A curable composition obtained by blending a polymerizable compound (A) having predetermined types of polymerizable functional groups, a reactive compound (B) having predetermined types of reactive functional groups, a compound (C) which is an imidazolyl group-containing compound having a predetermined structure, and a compound (D) which is an oxime compound or an oxime ester compound having a predetermined structure.

16 Claims, No Drawings

CURABLE COMPOSITION, ADHESIVE, METHOD OF PRODUCING FIBER-REINFORCED COMPOSITE MATERIAL, AND FIBER-REINFORCED COMPOSITE MATERIAL

CROSS-REFERENCE TO RELATED APPLICATIONS

This application claims priority to Japanese Patent Application No. 2014-045668, filed Mar. 7, 2014; and Japanese Patent Application No. 2014-189390, filed Sep. 17, 2014, the contents of which are incorporated herein by reference.

BACKGROUND OF THE INVENTION

Field of the Invention

The present invention relates to a curable composition that contains a polymerizable compound (A) having predetermined kinds of polymerizable functional groups and a reactive compound (B) having predetermined kinds of reactive functional groups; an adhesive formed of the curable composition; a method of producing a fiber-reinforced composite material using the curable composition; and a fiber-reinforced composite material including a matrix formed of a cured material of the curable composition and reinforced fibers.

Related Art

A curable composition containing a curable compound such as an epoxy compound, a curing agent and a curing catalyst are widely used in various applications such as an application for an adhesive, an application for sealing various electronic components, or an application for forming a matrix of a fiber-reinforced composite material.

In regard to such a curable composition, from a viewpoint of impregnation properties into a fiber base material formed of reinforced fibers at the time of producing a fiber-reinforced composite material or for ease of injection into a die at the time of sealing a minute electronic component, providing a cured material with excellent fluidity and mechanical characteristics is required.

In light of the above-described problem, for example, a curable composition that contains an alicyclic epoxy resin, a radical polymerizable monomer having a specific structure with a methacryloyloxy group and a carboxyl group, and a radical polymerization initiator in a specific ratio has been suggested (see Patent Document 1).

[Patent Document 1] Japanese Unexamined Patent Application, First Publication No. 2003-100562

SUMMARY OF THE INVENTION

Technical Problem

The curable composition disclosed in Patent Document 1 certainly provides a cured material with excellent fluidity and mechanical characteristics. However, in order to sufficiently cure the curable composition disclosed in Patent Document 1, curing at a high temperature of approximately 170° C. for approximately 10 minutes or a combination of preliminary-curing at 100° C. or lower for several hours and curing in a temperature range of, approximately, 120° C. to 160° C. for several hours needs to be performed.

When a curable composition is used for sealing various electronic components or for producing a fiber-reinforced composite material, the curable composition needs to be sufficiently cured at a low temperature in a short period of time from a viewpoint of reduction in the production cost or safety of an operation, but there is a problem in that the curable composition disclosed in Patent Document 1 does not satisfy the above-described condition.

Further, the curable composition is generally required to have a long pot life in which properties such as viscosity and the like are not changed even during long-term storage.

The present invention has been made in consideration of the above-described problems and an object thereof is to provide a curable composition which is capable of forming a cured material with excellent mechanical characteristics by being cured at a low temperature in a short period of time and has a long pot life; an adhesive which is formed of the curable composition; a method of producing a fiber-reinforced composite material using the curable composition; and a fiber-reinforced composite material which contains a matrix formed of the curable composition.

Solution to Problem

The present inventors found that the above-described problems can be solved with a curable composition obtained by blending a polymerizable compound (A) having predetermined kinds of polymerizable functional groups; a reactive compound (B) having predetermined kinds of reactive functional groups; a compound (C) which is an imidazolyl group-containing compound having a predetermined structure; and a compound (D) which is an oxime compound or an oxime ester compound having a predetermined structure with a curable composition, thereby completing the present invention.

According to a first aspect of the present invention, there is provided a curable composition including: a polymerizable compound (A) which is one or more compounds selected from the group consisting of an epoxy compound (A1) and a vinyl ether compound (A2); a reactive compound (B) which is one or more compounds selected from the group consisting of a compound (B1) having one or more functional groups selected from a hydroxyl group and a carboxyl group and a polyvalent carboxylic anhydride (B2); a compound (C) represented by the following formula (C1); and a compound (D) represented by the following formula (D1).

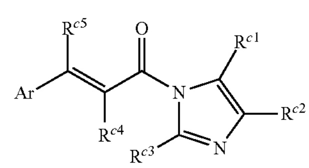

(C1)

In the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent.

(D1)

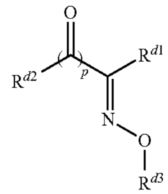

In the formula (D1), $R^{d1}$ represents an aliphatic hydrocarbon group having 1 to 10 carbon atoms which may have a substituent or an aryl group which may have a substituent; $R^{d2}$ represents an aliphatic hydrocarbon group having 1 to 10 carbon atoms or an aryl group which may have a substituent; $R^{d3}$ represents a hydrogen atom or a group represented by —CO—$R^{d5}$; $R^{d5}$ represents an alkyl group having 1 to 6 carbon atoms or an aryl group which may have a substituent; and p represents 0 or 1.

According to a second aspect of the present invention, there is provided an adhesive which is formed of the curable composition according to the first aspect.

According to a third aspect of the present invention, there is provided a method of producing a fiber-reinforced composite material including curing the curable composition according to the first aspect, which is impregnated into reinforced fibers, by heating.

According to a fourth aspect of the present invention, there is provided a fiber-reinforced composite material including: a matrix formed of a cured material of the curable composition according to the first aspect; and reinforced fibers.

Advantageous Effects of Invention

According to the present invention, it is possible to provide a curable composition which is capable of forming a cured material with excellent mechanical characteristics by being cured at a low temperature in a short period of time and has a long pot life; an adhesive which is formed of the curable composition; a method of producing a fiber-reinforced composite material using the curable composition; and a fiber-reinforced composite material which contains a matrix formed of the curable composition.

DETAILED DESCRIPTION OF THE INVENTION

Curable Composition

A curable composition contains a polymerizable compound (A), a reactive compound (B) having a predetermined structure, a compound (C) represented by the following formula (C1), and a compound (D) represented by the following formula (D1). In such a curable composition, a curing reaction generated between the polymerizable compound (A) and the reactive compound (B) is markedly accelerated even at a low temperature of, for example, approximately 130° C. by combining the compound (C) represented by the following formula (C1) and the compound (D) represented by the following formula (D1). For this reason, a cured material with excellent mechanical characteristics can be formed from such a curable composition even under the condition of curing at a low temperature in a short period of time.

(C1)

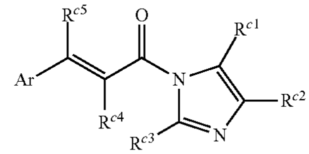

In the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent.

(D1)

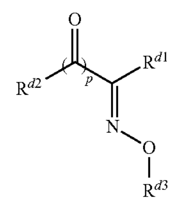

In the formula (D1), $R^{d1}$ represents an aliphatic hydrocarbon group having 1 to 10 carbon atoms or an aryl group which may have a substituent; $R^{d2}$ represents an aliphatic hydrocarbon group having 1 to 10 carbon atoms or an aryl group which may have a substituent; $R^{d3}$ represents a hydrogen atom or a group represented by —CO—$R^{d5}$; $R^{d5}$ represents an alkyl group having 1 to 6 carbon atoms or an aryl group which may have a substituent; and p represents 0 or 1.

Further, the curable composition may contain a solvent (S) for the purpose of adjustment of the viscosity or coating properties. Hereinafter, indispensable components or optional components contained in the curable composition will be sequentially described.

Polymerizable Compound (A)

The polymerizable compound (A) is one or more compounds selected from the group consisting of an epoxy compound (A1) and a vinyl ether compound (A2). The epoxy compound (A1) is an organic compound containing one or more epoxy groups (oxirane rings) in a molecule. The vinyl ether compound (A2) is an organic compound containing one or more vinyl ether groups in a molecule. Further, the vinyl ether group is a group represented by $CH_2{=}CH_2$—O— and bonded to a carbon atom. Accordingly, a vinyl oxime compound or a silane compound having a vinyloxysilyl group is not contained in the vinyl ether compound. Hereinafter, the epoxy compound (A1) and the vinyl ether compound (A2) will be sequentially described.

Epoxy Compound (A1)

The epoxy compound (A1) is not particularly limited as long as the compound contains an epoxy group. The epoxy compound (A1) can be selected from various compounds having an epoxy group which is contained in a curable composition in the related art. The epoxy compound (A1) may be a low molecular compound having an epoxy group which is a non-polymer or may be a polymer having an epoxy group. Hereinafter, in regard to the epoxy compound (A1), a non-polymer having an epoxy group and a polymer having an epoxy group will be sequentially described.

Non-Polymer Having Epoxy Group

As a non-polymer having an epoxy group, an aliphatic epoxy compound not containing an aromatic group is preferable from a viewpoint of excellent mechanical characteristics of a cured material formed using a curable composition. Among the aliphatic epoxy compounds, an aliphatic epoxy compound having an alicyclic epoxy group is preferable from a viewpoint of forming a cured material with excellent transparency and hardness.

Specific examples of the aliphatic epoxy compound having an alicyclic epoxy group include 2-(3,4-epoxycyclohexyl-5,5-spiro-3,4-epoxy)cyclohexane-meth-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ϵ-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylenebis(3,4-epoxycyclohexanecarboxylate), dioctyl epoxycyclohexahydro phthalate, di-2-ethylhexyl epoxycyclohexahydro phthalate, an epoxy resin having a tricyclodecene oxide group, and a compound represented by the following formula (A-1). Among these specific examples of the alicyclic epoxy compound, an alicyclic epoxy compound represented by the following formula (A-1) is preferable from a viewpoint of forming cured material with excellent transparency and high hardness.

(A-1)

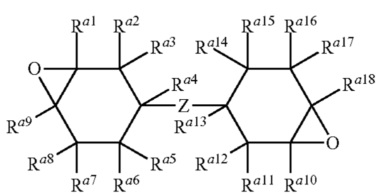

In the formula (A-1), Z represents a single bond, a divalent group selected from the group consisting of —O—, —O—CO—, —S—, —SO—, —$SO_2$—, —$CH_2$—, —$C(CH_3)_2$, $CBr_2$—, —$C(CBr_3)_2$—, —$C(CF_3)_2$—, and —$R^{a19}$—O—CO—; $R^{a19}$ represents an alkylene group having 1 to 8 carbon atoms; and $R^{a1}$ to $R^{a18}$ each independently represent a group selected from the group consisting of a hydrogen atom, a halogen atom, and an organic group.

In the formula (A-1), $R^{a19}$ represents an alkylene group having 1 to 8 carbon atoms and preferably represents a methylene group or an ethylene group.

In a case where $R^{a1}$ to $R^{a18}$ each independently represent an organic group, the organic group is not particularly limited within a range that does not inhibit the purpose of the present invention, and the organic group may be a hydrocarbon group, a group formed of a carbon atom and a halogen atom, or a group containing heteroatoms such as a halogen atom, an oxygen atom, a sulfur atom, a nitrogen atom, and a silicon atom in addition to a carbon atom and a hydrogen atom. Examples of the halogen atom include a chlorine atom, a bromine atom, an iodine atom, and a fluorine atom.

As the organic group, a group formed of a hydrocarbon group, a carbon atom, a hydrogen atom, and an oxygen atom; a halogenated hydrocarbon group; a group formed of a carbon atom, an oxygen atom, and a halogen atom; or a group formed of a carbon atom, a hydrogen atom, an oxygen atom, and a halogen atom is preferable. In a case where the organic group is a hydrocarbon group, the hydrocarbon group may be an aromatic hydrocarbon group, an aliphatic hydrocarbon group, or a group containing an aromatic skeleton or an aliphatic skeleton. The number of carbon atoms of the organic group is preferably in the range of 1 to 20, more preferably in the range of 1 to 10, and particularly preferably in the range of 1 to 5.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group, and an n-icosyl group; chain alkenyl groups such as a vinyl group, a 1-propenyl group, a 2-n-propenyl group (allyl group), a 1-n-butenyl group, a 2-n-butenyl group, and a 3-n-butenyl group; cycloalkyl groups such as a cyclopropyl group, a cyclobutyl group, a cyclopentyl group, a cyclohexyl group, and a cycloheptyl group; aryl groups such as a phenyl group, an o-tolyl group, an m-tolyl group, a p-tolyl group, an α-naphthyl group, a β-naphthyl group, a biphenyl-4-yl group, a biphenyl-3-yl group, a biphenyl-2-yl group, an anthryl group, and a phenanthryl group; and aralkyl groups such as a benzyl group, a phenethyl group, an α-naphthylmethyl group, a β-naphthylmethyl group, an α-naphthylethyl group, and a β-naphthylethyl group.

Specific examples of the halogenated hydrocarbon group include halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group, a perfluoropentyl group, a perflurohexyl group, a perfluoroheptyl group, a perfluorooctyl group, a perfluorononyl group, and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group, and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group, and a 4-fluorophenylmethyl group.

Specific examples of the group formed of a carbon atom, a hydrogen atom, and an oxygen atom include hydroxy chain alkyl groups such as a hydroxymethyl group, a 2-hydroxyethyl group, a 3-hydroxy-n-propyl group, and a 4-hydroxy-n-butyl group; halogenated cycloalkyl groups such as a 2-hydroxycyclohexyl group, a 3-hydroxycyclohexyl group, and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group, and a 3,5-dihydroxyphenyl group; hydroxyaralkyl groups such as a 2-hydroxyphenylmethyl group, a 3-hydroxyphenylmethyl group, and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxyl group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and n-icosyloxy group; chain alkenyloxy groups such as a vinyloxy group, a 1-propenyloxy group, a 2-n-propenyloxy group (allyloxy group), a 1-n-butenyloxy group, a 2-n-butenyloxy group, and a 3-n-butenyloxy group; aryloxy groups such as a phenoxy group, an o-tolyloxy group, an m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group; aralkyloxy groups such as a benzyloxy group, a phenethyloxy group, an α-naphthylmethyloxy group, a β-naphthylmethyloxy group, an α-naphthylethyloxy group, and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group, and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group, and a 4-n-propoxy-n-butyloxy group; alkoxyaryl groups such as a 2-methoxyphenyl group, a 3-methoxyphenyl group, and a 4-methoxyphenyl group; alkoxyaryloxy groups such as a 2-methoxyphenoxy group, a 3-methoxyphenoxy group, and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group, and a decanoyl group; aromatic acyl groups such as a benzoyl group, an α-naphthoyl group, and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexyloxycarbonyl group, an n-heptyloxycarbonyl group, an n-octyloxycarbonyl group, an n-nonyloxycarbonyl group, and an n-decyloxycarbonyl group; aryloxycarbonyl groups such as a phenoxycarbonyl group, an α-naphthoxycarbonyl group, and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group, and decanoyloxy group; and aromatic acyloxy groups such as a benzoyloxy group, an α-naphthoyloxy group and a β-naphthoyloxy group.

It is preferable that $R^{a1}$ to $R^{a18}$ each independently represent a group selected from the group consisting of a hydrogen atom, a halogen atom, an alkyl group having 1 to 5 carbon atoms, and an alkoxy group having 1 to 5 carbon atoms and more preferable that all of $R^{a1}$ to $R^{a18}$ represent a hydrogen atom in terms that a cured material obtained using particularly a curable composition is excellent in mechanical characteristics.

Among the alicyclic epoxy compounds represented by the formula (A-1), the following compounds 1 and 2 can be exemplified as specific examples of preferable compounds.

Compound 1

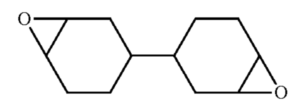

Compound 2

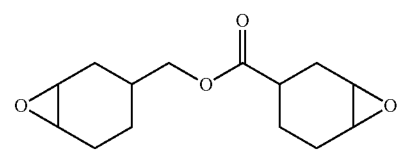

Examples of the non-polymer which can be used as the epoxy compound (A1) and has an epoxy group other than the aliphatic epoxy compounds having the above-described alicyclic epoxy groups, include epoxy alkyl(meth)acrylate such as glycidyl(meth)acrylate, 2-methylglycidyl(meth)acrylate, 3,4-epoxybutyl(meth)acrylate, or 6,7-epoxyheptyl(meth)acrylate; epoxy alkyloxy alkyl(meth)acrylate such as 2-glycidyloxyethyl(meth)acrylate, 3-glycidyloxy-n-propyl(meth)acrylate, 4-glycidyloxy-n-butyl(meth)acrylate, 5-glycidyloxy-n-hexyl(meth)acrylate, or 6-glycidyloxy-n-hexyl(meth)acrylate; a bifunctional epoxy resin such as a bisphenol A type epoxy resin, a bisphenol F type epoxy resin, a bisphenol S type epoxy resin, a bisphenol AD type epoxy resin, a naphthalene type epoxy resin, or a biphenyl type epoxy resin; a novolac epoxy resin such as a phenol novolac type epoxy resin, a brominated phenol novolac type epoxy resin, a ortho-cresol novolac type epoxy resin, a bisphenol A novolac type epoxy resin, or a bisphenol AD novolac type epoxy resin; a cyclic aliphatic epoxy resin such as an epoxide of a dicyclopentadiene type phenol resin; an aromatic epoxy resin such as an epoxide of a naphthalene type phenol resin; a glycidyl ester type epoxy resin such as dimer acid glycidyl ester or triglycidyl ester; a glycidyl amine type epoxy resin such as tetraglycidylamino diphenyl methane, triglycidyl-p-aminophenol, tetraglycidyl metaxylylene diamine, or tetraglycidyl bisaminomethyl cyclohexane; a heterocyclic epoxy resin such as triglycidyl isocyanurate; a trifunctional epoxy resin such as phloroglucinol triglycidyl ether, trihydroxy biphenyl triglycidyl ether, trihydroxy phenyl methane triglycidyl ether, glycerin triglycidyl ether, 2-[4-(2,3-epoxypropoxyl)phenyl]-2-[4-[1,1-bis

[4-(2,3-epoxypropoxyl)phenyl]ethyl]phenyl]propane, or 1,3-bis[4-[1-[4-(2,3-epoxypropoxyl)phenyl]-1-[4-[1-[4-(2,3-epoxypropoxyl)phenyl]-1-methylethyl]phenyl]ethyl]phenoxy]-2-propanol; a tetrafunctional epoxy resin such as tetrahydroxy phenyl ethane tetraglycidyl ether, tetraglycidyl benzophenone, bisresorcinol tetraglycidyl ether, or tetraglycidoxy biphenyl; and 1,2-epoxy-4-(2-oxiranyl)cyclohexane adduct of 2,2-bis(hydroxymethyl)-1-butanol. 1,2-Epoxy-4-(2-oxiranyl)cyclohexane adduct of 2,2-bis(hydroxymethyl)-1-butanol is commercially available as EHPE-3150 (manufactured by Daicel Corporation).

Polymer Having Epoxy Group

A polymer having an epoxy group may be a polymer obtained by polymerizing a monomer having an epoxy group or a monomer mixture that contains a monomer having an epoxy group or may be a polymer in which an epoxy group is introduced using a compound having an epoxy group such as epichlorohydrin with respect to a polymer having a functional group with reactivity such as a hydroxyl group, a carboxyl group, or an amino group. Further, a partial oxide of a polymer having an unsaturated aliphatic hydrocarbon group in the side chain such as 1,2-polybutadiene can be suitably used as a polymer having an epoxy group. Such a partial oxide contains an epoxy group formed due to oxidation of an unsaturated bond contained in the side chain.

As a polymer having an epoxy group, a polymer obtained by polymerizing a monomer having an epoxy group or a monomer mixture containing a monomer having an epoxy group or a partial oxide of a polymer having an unsaturated aliphatic hydrocarbon group in the side chain is preferable from a viewpoint of ease of obtainment, preparation, or adjustment of the amount of an epoxy group in a polymer.

Polymer of Monomer Having Epoxy Group or Monomer Mixture that Contains Monomer Having Epoxy Group Among the polymers having an epoxy group, a homopolymer of (meth)acrylic acid ester having an epoxy group or a copolymer of (meth)acrylic acid ester having an epoxy group and another monomer is preferable in terms of easy preparation or coating properties of a curable composition with respect to a base material.

The (meth)acrylic acid ester having an epoxy group may be (meth)acrylic acid ester having a chain aliphatic epoxy group or (meth)acrylic acid ester having an alicyclic epoxy group as described below. Further, the (meth)acrylic acid ester having an epoxy group may contain an aromatic group. Among the (meth)acrylic acid esters having an epoxy group, aliphatic(meth)acrylic acid ester having a chain aliphatic epoxy group or aliphatic(meth)acrylic acid ester having an alicyclic epoxy group is preferable and aliphatic(meth) acrylic acid ester having an alicyclic epoxy group is more preferable in terms of transparency of a cured material which is formed using a curable composition.

Examples of the (meth)acrylic acid ester containing an aromatic group and an epoxy group include 4-glycidyloxyphenyl(meth)acrylate, 3-glycidyloxyphenyl(meth)acrylate, 2-glycidyloxyphenyl(meth)acrylate, 4-glycidyloxyphenylmethyl(meth)acrylate, 3-glycidyloxyphenylmethyl(meth) acrylate, and 2-glycidyloxyphenylmethyl(meth)acrylate.

Examples of the aliphatic(meth)acrylic acid ester having a chain aliphatic epoxy group include (meth)acrylic acid ester in which a chain aliphatic epoxy group is bonded to an oxy group (—O—) in an ester group (—O—CO—) such as epoxy alkyl(meth)acrylate or epoxy alkyloxy alkyl(meth) acrylate can be exemplified. Such a chain aliphatic epoxy group included in (meth)acrylic acid ester may contain one or more oxy groups (—O—) in a chain. The number of carbon atoms of the chain aliphatic epoxy group, which is not particularly limited, is preferably in the range of 3 to 20, more preferably in the range of 3 to 15, and particularly preferably in the range of 3 to 10.

Specific examples of the aliphatic(meth)acrylic acid ester having a chain aliphatic epoxy group include epoxy alkyl (meth)acrylate such as glycidyl(meth)acrylate, 2-methylglycidyl(meth)acrylate, 3,4-epoxybutyl(meth)acrylate, or 6,7-epoxyheptyl(meth)acrylate; and epoxy alkyloxy alkyl(meth) acrylate such as 2-glycidyloxyethyl(meth)acrylate, 3-glycidyloxy-n-propyl(meth)acrylate, 4-glycidyloxy-n-butyl(meth)acrylate, 5-glycidyloxy-n-hexyl(meth)acrylate, or 6-glycidyloxy-n-hexyl(meth)acrylate.

Specific examples of the aliphatic(meth)acrylic acid ester having an alicyclic epoxy group include compounds represented by the following formulae (a2-1) to (a2-15). Among these, compounds represented by the following formulae (a2-1) to (a2-5) are preferable and compounds represented by the following formulae (a2-1) to (a2-3) are more preferable.

(a2-1)

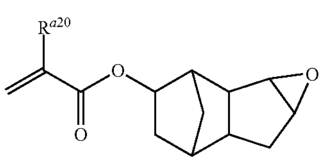

(a2-2)

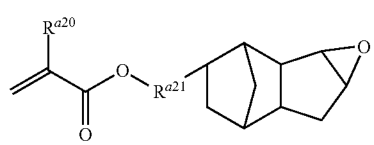

(a2-3)

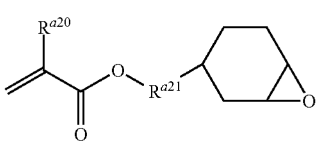

(a2-4)

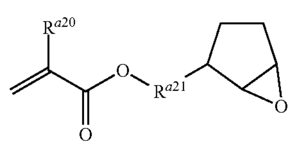

(a2-5)

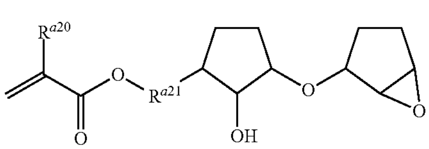

(a2-6)

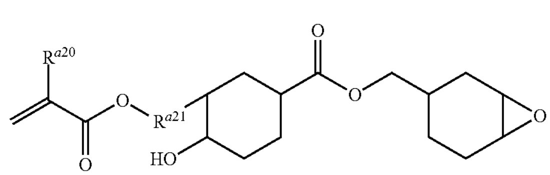

-continued (a2-7)

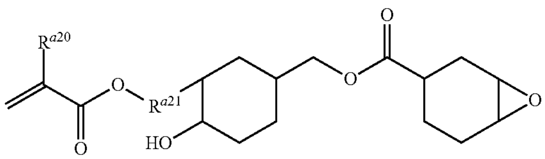

(a2-8)

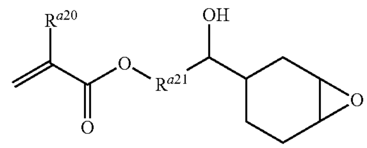

(a2-9)

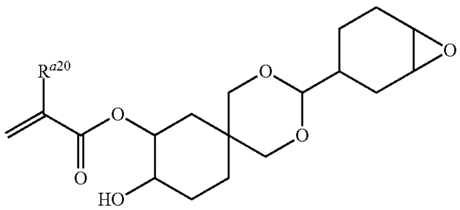

(a2-10)

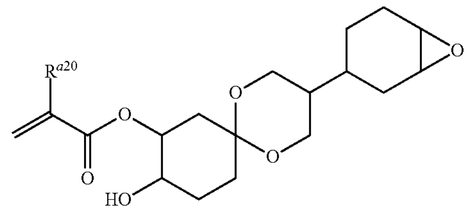

(a2-11)

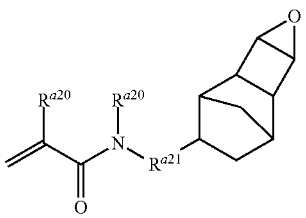

(a2-12)

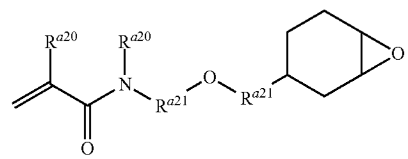

(a2-13)

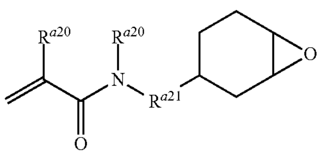

(a2-14)

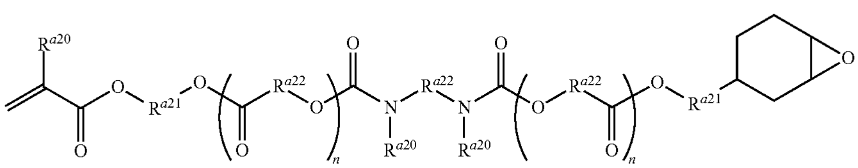

(a2-15)

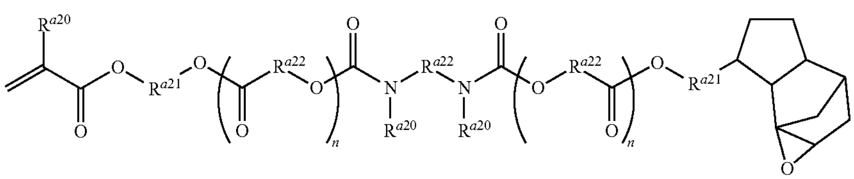

In the formulae, $R^{a20}$ represents a hydrogen atom or a methyl group; $R^{a21}$ represents a divalent aliphatic saturated hydrocarbon group having 1 to 6 carbon atoms; $R^{a22}$ represents a divalent hydrocarbon group having 1 to 10 carbon atoms; and n represents an integer of 0 to 10. As $R^{a21}$, a linear or branched alkylene group such as a methylene group, an ethylene group, a propylene group, a tetramethylene group, an ethylethylene group, a pentamethylene group, or a hexamethylene group is preferable. As $Ra^{22}$, a methylene group, an ethylene group, a propylene group, a tetramethylene group, an ethylethylene group, a pentamethylene group, a hexamethylene group, a phenylene group, or a cyclohexylene group is preferable.

Both of a homopolymer of (meth)acrylic acid ester having an epoxy group and a copolymer of (meth)acrylic acid ester having an epoxy group and another monomer can be used as the polymer having an epoxy group, and the content of a unit derived from (meth)acrylic acid ester having an epoxy group in the polymer having an epoxy group is preferably 70% by mass or more, more preferably 80% by mass or more, particularly preferably 90% by mass or more, and most preferably 100% by mass.

In the case where the polymer having an epoxy group is a copolymer of (meth)acrylic acid ester having an epoxy group and another monomer, examples of another monomer include unsaturated carboxylic acid, (meth)acrylic acid ester not containing an epoxy group, (meth)acrylamides, an allyl compound, vinyl ethers, vinyl esters, and styrenes. These compounds can be used alone or in combination of two or more kinds thereof. It is preferable that the copolymer of (meth)acrylic acid ester having an epoxy group and another monomer does not contain a unit derived from unsaturated carboxylic acid in terms of storage stability of a curable composition or chemical resistance to alkali or the like of a cured material formed using a curable composition.

Examples of the unsaturated carboxylic acid include (meth)acrylic acid, crotonic acid, maleic acid, fumaric acid, citraconic acid, mesaconic acid, itaconic acid, and anhydrides of these dicarboxylic acids.

Examples of the (meth)acrylic acid ester not containing an epoxy group include linear or branched alkyl(meth)acrylate such as methyl(meth)acrylate, ethyl(meth)acrylate, propyl (meth)acrylate, amyl(meth)acrylate, or t-octyl(meth)acrylate; chloroethyl(meth)acrylate, 2,2-dimethylhydroxypropyl (meth)acrylate, 2-hydroxyethyl(meth)acrylate, trimethylolpropane mono(meth)acrylate, benzyl(meth) acrylate, furfuryl(meth)acrylate, and (meth)acrylic acid ester having a group with an alicyclic skeleton. Among (meth) acrylic acid esters not containing an epoxy group, (meth) acrylic acid ester having a group with an alicyclic skeleton is preferable in terms of transparency of a cured material formed using a curable composition.

In (meth)acrylic acid ester having a group with an alicyclic skeleton, an alicyclic group constituting an alicyclic skeleton may be monocyclic or polycyclic. Examples of the monocyclic alicyclic group include a cyclopentyl group and a cyclohexyl group. Further, examples of the polycyclic alicyclic group include a norbornyl group, an isobornyl group, a tricyclononyl group, a tricyclodecyl group, and a tetracyclododecyl group.

Examples of the (meth)acrylic acid ester having a group with an alicyclic skeleton include compounds represented by the following formulae (a3-1) to (a3-8). Among these, compounds represented by the following formulae (a3-3) to (a3-8) are preferable and a compound represented by the following formula (a3-3) or (a3-4) is more preferable.

(a3-1)

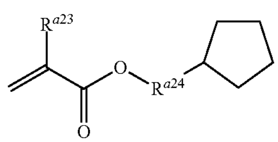

(a3-2)

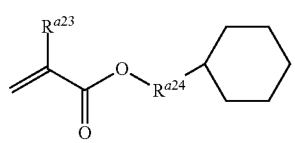

(a3-3)

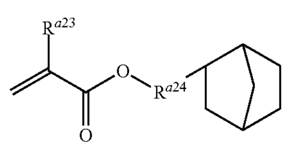

(a3-4)

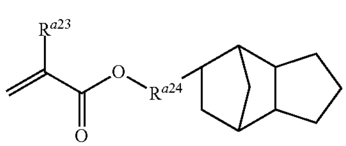

(a3-5)

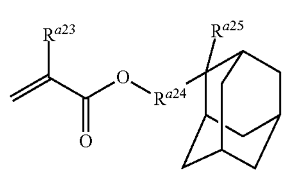

-continued (a3-6)

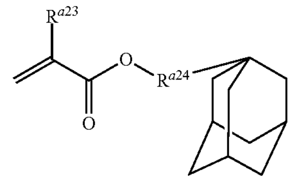

(a3-7)

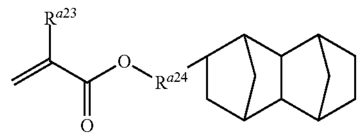

(a3-8)

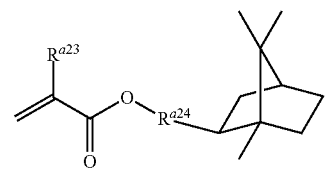

In the formulae, $R^{a23}$ represents a hydrogen atom or a methyl group; $R^{a24}$ represents a single bond or a divalent aliphatic saturated hydrocarbon group having 1 to 6 carbon atoms; and $R^{a25}$ represents a hydrogen atom or an alkyl group having 1 to 5 carbon atoms. As $R^{a24}$, a single bond, a linear or branched alkylene group such as a methylene group, an ethylene group, a propylene group, a tetramethylene group, an ethylethylene group, a pentamethylene group, or a hexamethylene group is preferable. As $R^{a25}$, a methyl group or an ethyl group is preferable.

Examples of (meth)acrylamides include (meth)acrylamide, N-alkyl(meth)acrylamide, N-aryl(meth)acrylamide, N,N-dialkyl(meth)acrylamide, N,N-aryl(meth)acrylamide, N-methyl-N-phenyl(meth)acrylamide, and N-hydroxyethyl-N-methyl(meth)acrylamide.

Examples of the allyl compound include allyl esters such as allyl acetate, allyl caproate, allyl caprylate, allyl laurate, allyl palmitate, allyl stearate, allyl benzoate, allyl acetoacetate, or allyl lactate; and allyloxy ethanol.

Examples of vinyl ethers include alkyl vinyl ether such as hexyl vinyl ether, octyl vinyl ether, decyl vinyl ether, ethyl hexyl vinyl ether, methoxy ethyl vinyl ether, ethoxy ethyl vinyl ether, chloroethyl vinyl ether, 1-methyl-2,2-dimethylpropylvinylether, 2-ethylbutylvinylether, hydroxy ethyl vinyl ether, diethylene glycol vinyl ether, dimethylamino ethyl vinyl ether, diethylamino ethyl vinyl ether, butylamino ethyl vinyl ether, benzyl vinyl ether, or tetrahydrofurfuryl vinyl ether; and vinyl aryl ether such as vinyl phenyl ether, vinyl tolyl ether, vinyl chlorophenyl ether, vinyl-2,4-dichlorophenylether, vinyl naphthyl ether, or vinyl anthranyl ether.

Examples of vinyl esters include vinyl butyrate, vinyl isobutyrate, vinyl trimethyl acetate, vinyl diethyl acetate, vinyl valate, vinyl caproate, vinyl chloroacetate, vinyl dichloroacetate, vinyl methoxy acetate, vinyl butoxy acetate, vinyl phenyl acetate, vinyl acetoacetate, vinyl lactate, vinyl-β-phenylbutyrate, vinyl benzoate, vinyl salicylic acid, vinyl chlorobenzoate, vinyl tetrachlorobenzoate, and vinyl naphthoic acid.

Examples of styrenes include styrene; alkyl styrene such as methyl styrene, dimethyl styrene, trimethyl styrene, ethyl styrene, diethyl styrene, isopropyl styrene, butyl styrene, hexyl styrene, cyclohexyl styrene, decyl styrene, benzyl styrene, chloromethyl styrene, trifluoromethyl styrene, ethoxy methyl styrene, or acetoxy methyl styrene; alkoxy styrene such as methoxy styrene, 4-methoxy-3-methyl styrene, or dimethoxy styrene; and halostyrene such as chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, or 4-fluoro-3-trifluoromethylstyrene.

Partial oxide of polymer having unsaturated aliphatic hydrocarbon group in side chain The polymer having an unsaturated aliphatic hydrocarbon group in the side chain is not particularly limited, but 1,2-polybutadiene having a vinyl group in the side chain is preferable from a viewpoint of ease of obtainment or synthesis. Epoxidized polybutadiene having an oxiranyl group and a vinyl group in the side chain can be obtained by partially oxidizing 1,2-polybutadiene. The ratio of the oxiranyl group in such an epoxidized polybutadiene is preferably in the range of 10 mol % to 70 mol %, more preferably in the range of 10 mol % to 50 mol %, and still more preferably in the range of 10 mol % to 40 mol % based on the total number of moles of the oxiranyl group and the vinyl group. As the epoxidized polybutadiene, commercially available Jβ-100 or Jβ-200 (manufactured by NIPPON SODA CO., LTD.) can be suitably used.

The molecular weight of the polymer having an epoxy group described above is not particularly limited within a range that does not inhibit the purpose of the present invention, but the mass average molecular weight thereof in terms of polystyrene is preferably in the range of 3000 to 30000 and more preferably in the range of 5000 to 15000.

Vinyl Ether Compound (A2)

The vinyl ether compound (A2) is not particularly limited as long as the compound is an organic compound containing one or more vinyl ether groups in a molecule. A monovalent or polyvalent organic group which is a mother nucleus to which a vinyl ether group is bonded may be a hydrocarbon group or an organic group containing heteroatoms. Examples of the heteroatoms include O, S, N, P, and a halogen atom.

As the vinyl ether compound (A2), a monovinyl ether compound containing one vinyl ether group or a divinyl ether compound containing two vinyl ether groups is preferable and divinyl ether compound is more preferable in terms of ease of synthesis or obtainment and transparency and mechanical characteristics of a cured material.

Specific examples of the monovinyl ether compound include alkyl vinyl ether or alkoxy alkyl vinyl ether such as ethyl vinyl ether, n-propyl-vinyl ether, n-butyl vinyl ether, n-pentyl vinyl ether, n-hexyl vinyl ether, n-octyl vinyl ether, n-decyl vinyl ether, cyclohexyl vinyl ether, 2-ethyl-n-hexyl vinyl ether, 2-methoxy ethyl vinyl ether, or 2-ethoxy ethyl vinyl ether; a hydroxyl group-containing aliphatic vinyl ether such as 2-vinyloxy ethanol, 2-vinyloxy propanol, 3-vinyloxy propanol, 2-vinyloxy butanol, 4-vinyloxy butanol, 6-vinyloxy hexanol, 2-(vinyloxyethoxy)ethanol, 2-(vinyloxyethoxyethoxy)ethanol, diethylene glycol monovinyl ether, triethylene glycol monovinyl ether, polyethylene glycol monovinyl ether, dipropylene glycol monovinyl ether, tripropylene glycol monovinyl ether, or polypropylene glycol monovinyl ether; halogen-containing vinyl ether such as 1-chloro-2-vinyloxyethane, 1-chloro-3-vinyloxypropane, 1-chloro-4-vinyloxy-n-butane, 1-chloro-6-vinyloxy-n-hexane, 1-chloro-2-(vinyloxyethoxy)-n-propane, 1-chloro-2-(hydroxyethoxy)propane, or 1-chloro-2-(vinyloxyethoxyethoxy)ethane; and aromatic vinyl ether such as vinyl phenyl ether, 4-vinyloxy toluene, 3-vinyloxy toluene, 2-vinyloxy toluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxy naphthalene, 2-vinyloxy naphthalene, 4-vinyloxy-1,1'-biphenyl, 3-vinyloxy-1,1'-biphenyl, 2-vinyloxy-1,1'-biphenyl, benzyl vinyl ether, 6-vinyloxy tetralin, or 5-vinyloxy tetralin.

Specific examples of the divinyl ether compound include chain aliphatic divinyl ether such as ethylene glycol divinyl ether, diethylene glycol divinyl ether, triethylene glycol divinyl ether, polyethylene glycol divinyl ether, propylene glycol divinyl ether, dipropylene glycol divinyl ether, tripropylene glycol divinyl ether, polypropylene glycol divinyl ether, 1,3-propanediol divinyl ether, 1,4-butanediol divinyl ether, 1,5-pentanediol divinyl ether, 1,6-hexanediol divinyl ether, 1,8-octanediol divinyl ether, 1,10-decanediol divinyl ether, 1,4-cyclohexanediol divinyl ether, or 1,4-chclohexane dimethanol divinyl ether; cyclic aliphatic divinyl ether such as 1,4-cyclohexanediol divinyl ether, 1,4-cyclohexane dimethanol divinyl ether, or 2-vinyloxy-5-(vinyloxymethyl)-7-oxabicyclo[2.2.1]heptane; and aromatic divinyl ether such as 1,4-divinyloxy benzene, 1,3-divinyloxy benzene, 1,2-divinyloxy benzene, 1,4-divinyloxy naphthalene, 1,3-divinyloxy naphthalene, 1,2-divinyloxy naphthalene, 1,5-divinyloxy naphthalene, 1,6-divinyloxy naphthalene, 1,7-divinyloxy naphthalene, 1,8-divinyloxy naphthalene, 2,3-divinyloxy naphthalene, 2,6-divinyloxy naphthalene, 2,7-divinyloxy naphthalene, 4,4'-divinyloxy biphenyl, 3,3'-divinyloxy biphenyl, 2,2'-divinyloxy biphenyl, 3,4'-divinyloxy biphenyl, 2,3'-divinyloxy biphenyl, 2,4'-divinyloxy biphenyl, bisphenol A divinyl ether, 1,4-benzene dimethanol divinyl ether, 1,3-benzene dimethanol divinyl ether, 1,2-benzene dimethanol divinyl ether, or naphthalene-1,4-bismethanol divinyl ether.

As preferable compounds among the above-described vinyl ether compounds, compounds represented by the following formulae can be exemplified.

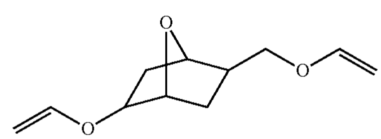

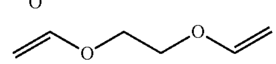

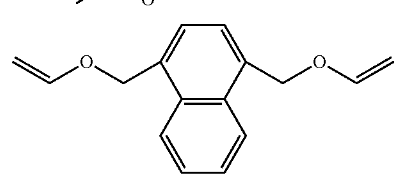

Further, the vinyl ether compound represented by the following formula (A-2) is also preferable in terms of capability of forming a cured material with excellent transparency and mechanical characteristics.

(A-2)

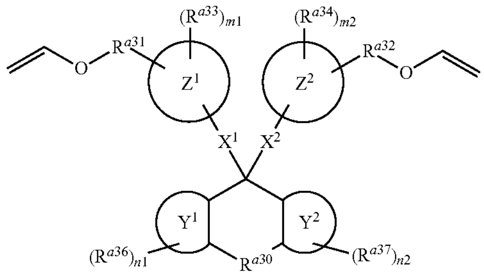

In the formula (A-2), a ring $Z^1$ and a ring $Z^2$ represent the same or different aromatic hydrocarbon rings; a ring $Y^1$ and a ring $Y^2$ represent the same or different aromatic hydrocarbon rings; $X^1$ and $X^2$ each independently represent a single bond or a group represented by —S—; $R^{a30}$ represents a single bond, a methylene group which may have a substituent, an ethylene group which may have a substituent or contain a heteroatom between two carbon atoms, a group represented by —O—, a group represented by —NH—, or a group represented by —S—; $R^{a31}$ and $R^{a32}$ each independently represent a single bond or an alkylene group having 1 to 4 carbon atoms; $R^{a33}$ and $R^{a34}$ each independently represent a monovalent hydrocarbon group, a hydroxyl group, a group represented by $—OR^{a35}$, a group represented by $—SR^{a35}$, an acyl group, an alkoxycarbonyl group, a halogen atom, a nitro group, a cyano group, a mercapto group, a carboxyl group, an amino group, a carbamoyl group, a group represented by $—NHR^{a35}$, a group represented by $—N(R^{a35})_2$, a (meth)acryloyloxy group, a sulfo group, or a group in which at least some hydrogen atoms bonded to carbon atoms contained in a monovalent hydrocarbon group, a group represented by $—OR^{a35}$, a group represented by $—SR^{a35}$, an acyl group, an alkoxycarbonyl group, a group represented by $—NHR^{a35}$, or a group represented by $—N(R^{a35})_2$ are substituted with a monovalent hydrocarbon group, a hydroxyl group, a group represented by $—OR^{a35}$, a group represented by $—SR^{a35}$, an acyl group, an alkoxycarbonyl group, a halogen atom, a nitro group, a cyano group, a mercapto group, a carboxyl group, an amino group, a carbamoyl group, a group represented by $—NHR^{a35}$, a group represented by $—N(R^{a35})_2$, a (meth) acryloyloxy group, a mesyloxy group, or a sulfo group; $R^{a36}$ and $R^{a37}$ each independently represent a cyano group, a halogen atom, or a monovalent hydrocarbon group; $R^{a35}$ represents a monovalent hydrocarbon group; m1 and m2 each independently represent an integer of 0 or higher; and n1 and n2 each independently represent an integer of 0 to 4.

In the formula (A-2), as a ring $Z^1$ and a ring $Z^2$, a benzene ring or a condensed polycyclic aromatic hydrocarbon ring [for example, condensed bicyclic to tetracyclic aromatic hydrocarbon rings such as a condensed bicyclic hydrocarbon ring (for example, a condensed bicyclic hydrocarbon ring having 8 to 20 carbon atoms such as a naphthalene ring and preferably a condensed bicyclic hydrocarbon ring having 10 to 16 carbon atoms) and a condensed tricyclic aromatic hydrocarbon ring (for example, an anthracene ring or a phenanthrene ring)] can be exemplified. The ring $Z^1$ and the ring $Z^2$ preferably represent a benzene ring or a naphthalene ring and more preferably represent a naphthalene ring. Further, the ring $Z^1$ and the ring $Z^2$ may be the same as or different from each other. For example, one ring may represent a benzene ring and the other may represent a naphthalene ring, but both rings particularly preferably represent a naphthalene ring. Further, the substitution position of the ring $Z^1$ or the ring $Z^2$ bonded to a carbon atom, to which both of $X^1$ and $X^2$ directly bonded, through $X^1$ or $X^2$ is not particularly limited. In a case where the ring $Z^1$ or the ring $Z^2$ represents a naphthalene ring, a group corresponding to the ring $Z^1$ or the ring $Z^2$ bonded to the above-described carbon atom may be a 1-naphthyl group or a 2-naphthyl group.

In the formula (A-2), as a ring $Y^1$ and a ring $Y^2$, a benzene ring or a condensed polycyclic aromatic hydrocarbon ring [for example, condensed bicyclic to tetracyclic aromatic hydrocarbon rings such as a condensed bicyclic hydrocarbon ring (for example, a condensed bicyclic hydrocarbon ring having 8 to 20 carbon atoms such as a naphthalene ring and preferably a condensed bicyclic hydrocarbon ring having 10 to 16 carbon atoms) and a condensed tricyclic aromatic hydrocarbon ring (for example, an anthracene ring or a phenanthrene ring)] can be exemplified. The ring $Y^1$ and the ring $Y^2$ preferably represent a benzene ring or a naphthalene ring. Further, the ring $Y^1$ and the ring $Y^2$ may be the same as or different from each other. For example, one ring may represent a benzene ring and the other may represent a naphthalene ring.

In the formula (A-2), $X^1$ and $X^2$ each independently represent a single bond or a group represented by —S—, and $X^1$ and $X^2$ typically represent a single bond.

In the formula (A-2), $R^{30}$ represents a single bond, a methylene group which may have a substituent, an ethylene group which may have a substituent and may contain a heteroatom between two carbon atoms, a group represented by —O—, a group represented by —NH—, or a group represented by —S—, and $R^{30}$ typically represents a single bond. Here, examples of the substituent include a cyano group, a halogen atom (a fluorine atom, a chlorine atom, a bromine atom, or the like), and a monovalent hydrocarbon group [for example, an alkyl group (an alkyl group having 1 to 6 carbon atoms such as a methyl group, an ethyl group, a propyl group, an isopropyl group, a butyl group, or t-butyl), and an aryl group (an aryl group having 6 to 10 carbon atoms such as a phenyl group)], and examples of the heteroatom include an oxygen atom, a nitrogen atom, an sulfur atom, and a silicon atom.

In the formula (A-2), as $R^{a31}$ and $R^{a32}$, for example, a single bond; or an alkylene group having 1 to 4 carbon atoms such as a methylene group, an ethylene group, a trimethylene group, a propylene group, or a butane-1,2-diyl group can be exemplified. Among these, a single bond; or an alkylene group having 2 to 4 carbon atoms (particularly, an alkylene group having 2 or 3 carbon atoms such as an ethylene group or a propylene group) is preferable and a single bond is more preferable. Further, $R^{1a}$ and $R^{1b}$ may be the same as or different from each other.

In the formula (A-2), as $R^{a33}$ and $R^{a34}$, for example, monovalent hydrocarbon groups such as an alkyl group (for example, an alkyl group having 1 to 12 carbon atoms such as a methyl group, an ethyl group, a propyl group, an isopropyl group, or a butyl group, preferably an alkyl group having 1 to 8 carbon atoms, and more preferably an alkyl group having 1 to 6 carbon atoms), a cycloalkyl group (a cycloalkyl group having 5 to 10 carbon atoms such as a cyclohexyl group, preferably a cycloalkyl group having 5 to 8 carbon atoms, and more preferably a cycloalkyl group having 5 or 6 carbon atoms), an aryl group (for example, an aryl group having 6 to 14 carbon atoms such as a phenyl group, a tolyl group, a xylyl group, or a naphthyl group, preferably an aryl group having 6 to 10 carbon atoms, and more preferably an aryl group having 6 to 8 carbon atoms), and an aralkyl group (a $C_{6-10}$ aryl-$C_{1-4}$ alkyl group such as a benzyl group or a phenethyl group); a hydroxyl group; a group represented by —$OR^{a35}$ [in the formula, $R^{a35}$ represents a monovalent hydrocarbon group (monovalent hydrocarbon groups described above and the like)] such as an alkoxy group (an alkoxy group having 1 to 12 carbon atoms such as a methoxy group, an ethoxy group, a propoxy group, or a butoxy group, preferably an alkoxy group having 1 to 8 carbon atoms, and more preferably an alkoxy group having 1 to 6 carbon atoms), a cycloalkoxy group (a cycloalkoxy group having 5 to 10 carbon atoms such as a cyclohexyloxy group), an aryloxy group (an aryloxy group having 6 to 10 carbon atoms such as a phenoxy group), or an aralkyloxy group (for example, a $C_{6-10}$ aryl-$C_{1-4}$ alkyloxy group such as a benzyloxy group); a group represented by —$SR^{a35}$ [in the formula, $R^{a35}$ represents a monovalent hydrocarbon group (monovalent hydrocarbon groups described above and the like)] such as an alkylthio group (an alkylthio group having 1 to 12 carbon atoms such as a methylthio group, an ethylthio group, a propylthio group, or a butylthio group, preferably an alkylthio group having 1 to 8 carbon atoms, and more preferably an alkylthio group having 1 to 6 carbon atoms), a cycloalkylthio group (a cycloalkylthio group having 5 to 10 carbon atoms such as a cyclohexylthio group), an arylthio group (an arylthio group having 6 to 10 carbon atoms such as a phenylthio group), or an aralkylthio group (for example, a $C_{6-10}$ aryl-$C_{1-4}$ alkylthio group such as a benzylthio group); an acyl group (an acyl group having 1 to 6 carbon atoms such as an acetyl group); an alkoxycarbonyl group (a $C_{1-4}$ alkoxy-carbonyl group such as a methoxycarbonyl group); a halogen atom (a fluorine atom, a chlorine atom, a bromine atom, or an iodine atom); a nitro group; a cyano group; a mercapto group; a carboxyl group; an amino group; a carbamoyl group; a group represented by —$NHR^{a35}$ [in the formula, $R^{a35}$ represents a monovalent hydrocarbon group (monovalent hydrocarbon groups described above and the like)] such as an alkylamino group (an alkylamino group having 1 to 12 carbon atoms such as a methylamino group, an ethylamino group, a propylamino group, or a butylamino group, preferably an alkylamino group having 1 to 8 carbon atoms, and more preferably an alkylamino group having 1 to 6 carbon atoms), a cycloalkylamino group (a cycloalkylamino group having 5 to 10 carbon atoms such as a cyclohexylamino group), an arylamino group (an arylamino group having 6 to 10 carbon atoms such as a phenylamino group), or an aralkylamino group (for example, a $C_{6-10}$ aryl-$C_{1-4}$ alkylamino group such as a benzylamino group); a group represented by —$N(R^{a35})_2$ [in the formula, $R^{a35}$ independently represents a monovalent hydrocarbon group (monovalent hydrocarbon groups described above and the like)] such as a dialkylamino group (a di($C_{1-12}$ alkyl)amino group such as a dimethylamino group, a diethylamino group, a dipropylamino group, or a dibutylamino group, preferably a di($C_{1-8}$ alkyl)amino group, and more preferably a di($C_{1-6}$ alkyl)amino group), a dicycloalkylamino group (a di($C_{5-10}$ cycloalkyl)amino group such as a dicyclohexylamino group), a diarylamino group (a di($C_{6-10}$ aryl)amino group such as a diphenylamino group), or a diaralkylamino group (for example, a di($C_{6-10}$ aryl-$C_{1-4}$ alkyl)amino group such as a dibenzylamino group); a (meth) acryloyloxy group; a sulfo group; and a group [for example, an alkoxyaryl group (for example, a $C_{1-4}$ alkoxy-$C_{6-10}$ aryl group such as a methoxyphenyl group) or an alkoxycarbonylaryl group (for example, a $C_{1-4}$ alkoxy-carbonyl-$C_{6-10}$ aryl group such as a methoxycarbonylphenyl group or an ethoxycarbonylphenyl group)] in which at least some hydrogen atoms bonded to carbon atoms contained in the monovalent hydrocarbon group, the group represented by —$OR^{a35}$, the group represented by —$SR^{a35}$, the acyl group, the alkoxycarbonyl group, the group represented by —$NHR^{a35}$, or the group represented by —$N(R^{a35})_2$ are substituted with the monovalent hydrocarbon group, the hydroxyl group, the group represented by —$OR^{a35}$, the group represented by —$SR^{a35}$, the acyl group, the alkoxycarbonyl group, the halogen atom, the nitro group, the cyano group, the mercapto group, the carboxyl group, the amino group, the carbamoyl group, the group represented by —$NHR^{a35}$, the group represented by —$N(R^{a35})_2$, the (meth) acryloyloxy group, the mesyloxy group, or the sulfo group can be exemplified.

Among these, typically, $R^{a33}$ and $R^{a34}$ each may independently represent a monovalent hydrocarbon group, a group represented by —$OR^{a35}$, a group represented by —$SR^{a35}$, an acyl group, an alkoxycarbonyl group, a halogen atom, a nitro group, a cyano group, a group represented by —$NHR^{a35}$, or a group represented by —$N(R^{a35})_2$.

As $R^{a33}$ and $R^{a34}$, preferably, a monovalent hydrocarbon group [for example, an alkyl group (for example, an alkyl group having 1 to 6 carbon atoms), a cycloalkyl group (for example, a cycloalkyl group having 5 to 8 carbon atoms), an aryl group (for example, an aryl group having 6 to 10 carbon atoms), or an aralkyl group (for example, a $C_{6-8}$ aryl-$C_{1-2}$ alkyl group)] or an alkoxy group (an alkoxy group having 1 to 4 carbon atoms) can be exemplified. Particularly, it is preferable that $R^{a33}$ and $R^{a34}$ represent a monovalent hydrocarbon group (particularly, an alkyl group) such as an alkyl group [an alkyl group having 1 to 4 carbon atoms (particularly, a methyl group)], or an aryl group [for example, an aryl group having 6 to 10 carbon atoms (particularly, a phenyl group)].

In addition, in a case where m1 is an integer of 2 or higher, $R^{a33}$'s may be the same as or different from each other. Further, in a case where m2 is an integer of 2 or higher, $R^{a34}$'s may be the same as or different from each other. Moreover, $R^{a33}$ and $R^{a34}$ may be the same as or different from each other.

In the formula (A-2), the value of m1 of $R^{a33}$ can be selected according to the kind of ring $Z^1$ and, for example, may be in the range of 0 to 4, preferably in the range of 0 to 3, and more preferably in the range of 0 to 2. In addition, in the general formula (1) above, the value of m2 of $R^{a34}$ can be selected according to the kind of ring $Z^2$ and, for example, may be in the range of 0 to 4, preferably in the range of 0 to 3, and more preferably in the range of 0 to 2. Further, m1 and m2 may be the same as or different from each other.

In the formula (A-2), as $R^{a36}$ and $R^{a37}$, typically, a non-reactive substituent such as a cyano group, a halogen atom (a fluorine atom, a chlorine atom, or a bromine atom), or a monovalent hydrocarbon group [for example, an alkyl group or an aryl group (an aryl group having 6 to 10 carbon atoms such as a phenyl group)] can be exemplified. Among these, a cyano group or an alkyl group is preferable and an alkyl group is particularly preferable. Examples of the alkyl group include an alkyl group having 1 to 6 carbon atoms (for example, an alkyl group having 1 to 4 carbon atoms, particularly, a methyl group) such as a methyl group, an ethyl group, a propyl group, an isopropyl group, a butyl group, or a t-butyl group. In addition, in a case where n1 is an integer of 2 or higher, $R^{a36}$'s may be the same as or different from each other. Further, in a case where n2 is an integer of 2 or higher, $R^{a37}$'s may be the same as or different from each other. Further, $R^{a36}$ and $R^{a37}$ may be the same as or different from each other. Further, each bonding position (substitution position) of $R^{a36}$ and $R^{a37}$ to the ring $Y^1$ and the ring $Y^2$ is not particularly limited. The substitution numbers n1 and n2 are preferably 0 or 1 and particularly preferably 0. Further, n1 and n2 may be the same as or different from each other.
As preferred specific examples of the vinyl ether compound represented by the formula (A-2) above, the following compounds can be exemplified.
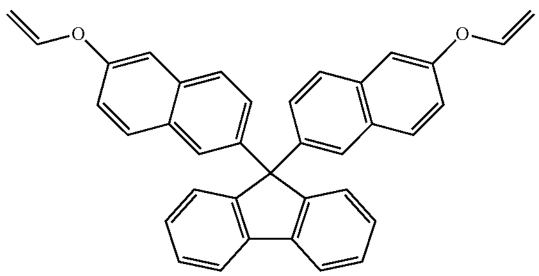
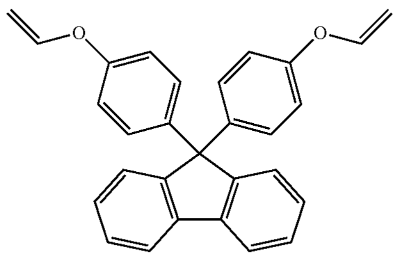
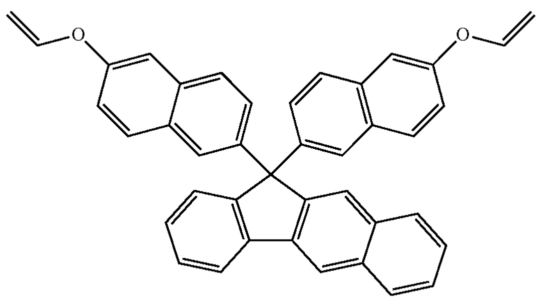
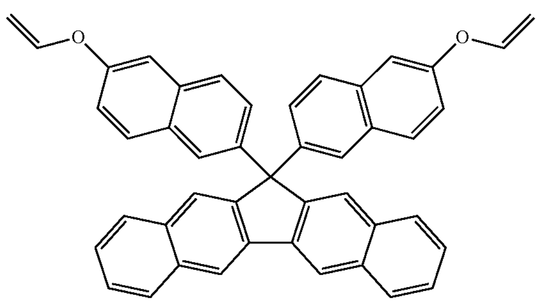
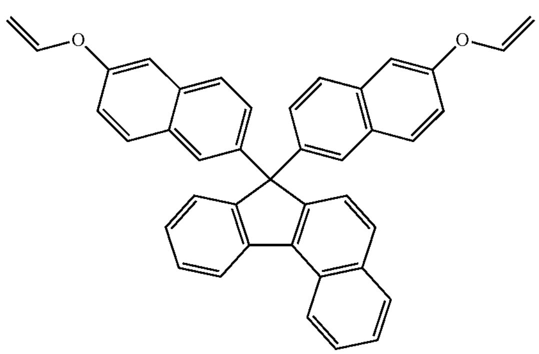
-continued
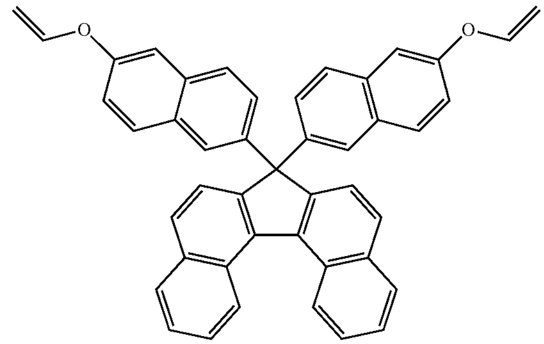
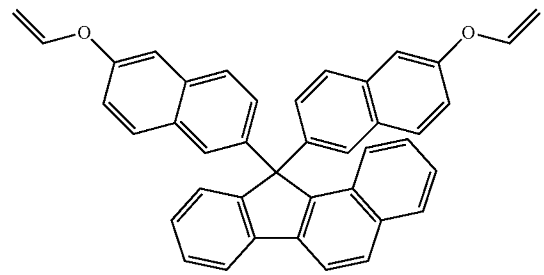
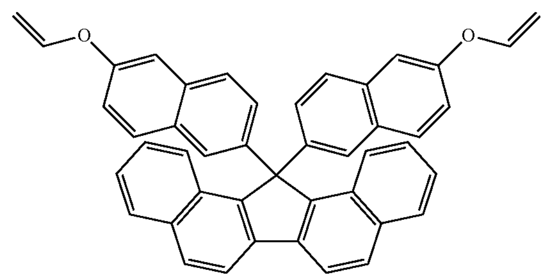
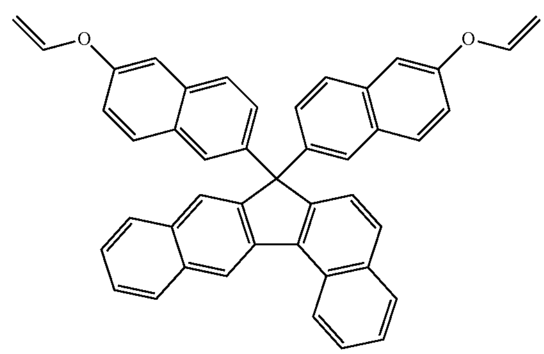
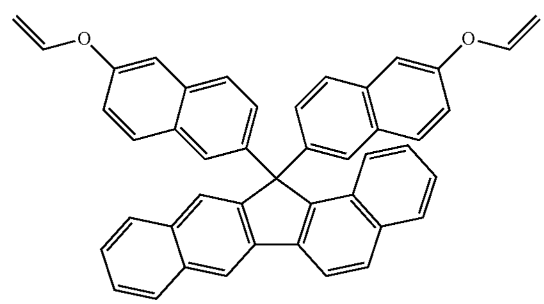

-continued
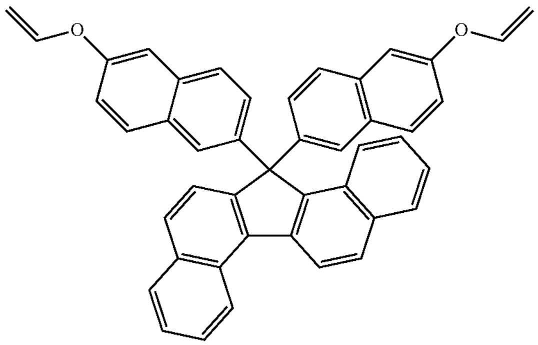
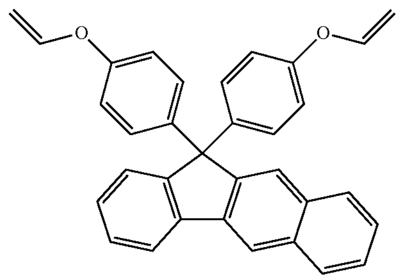
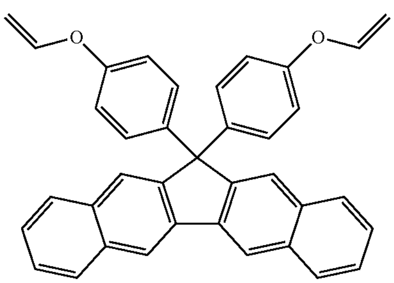
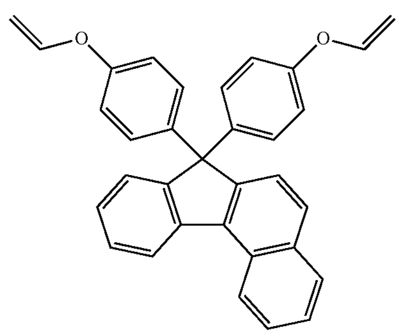
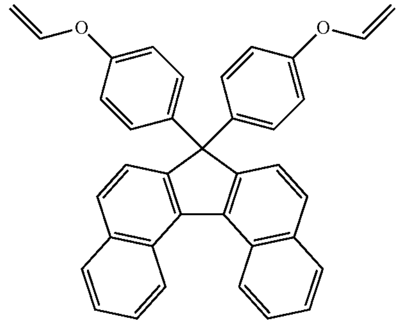
-continued
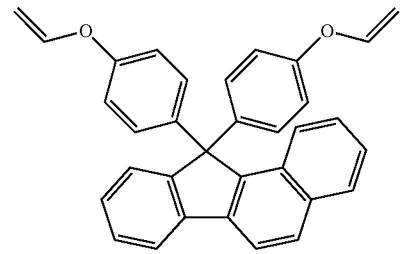
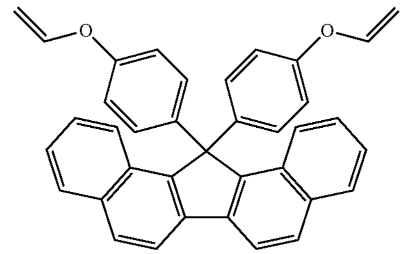
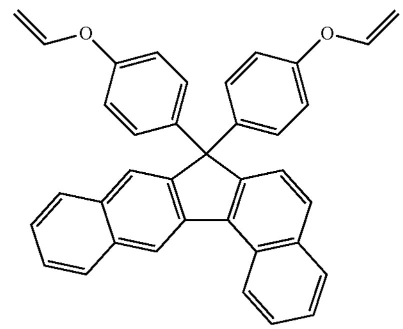
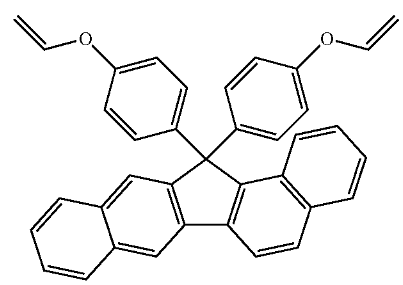
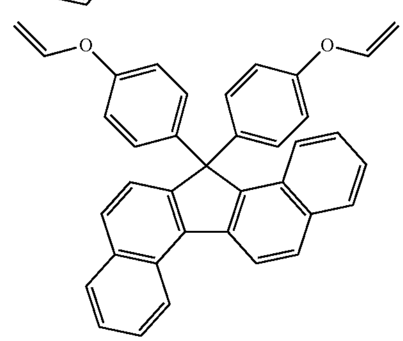
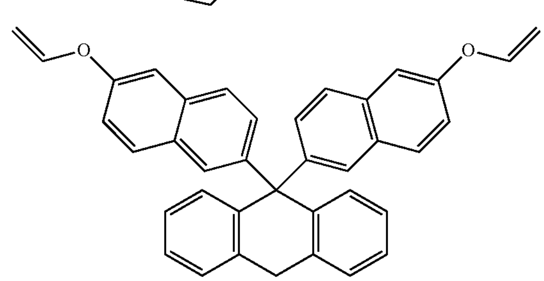

-continued

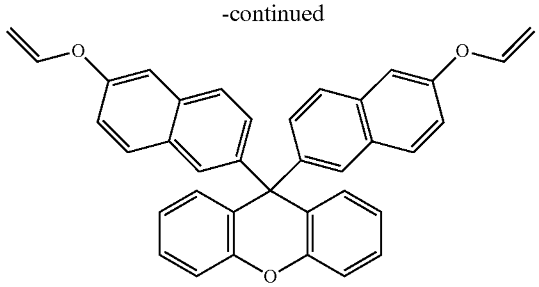

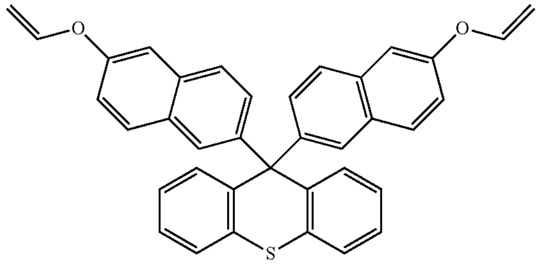

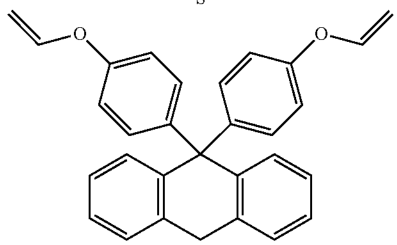

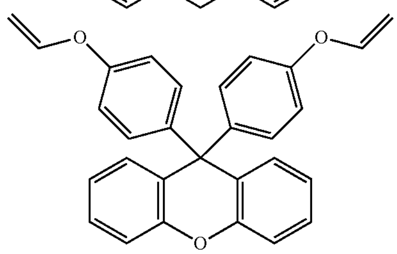

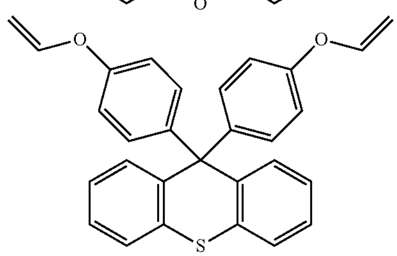

The content of the polymerizable compound (A) in the curable composition is preferably in the range of 40% by mass to 80% by mass and more preferably in the range of 45% by mass to 70% by mass based on the total mass of the components other than the solvent (S) in the curable composition.

Reactive Compound (B)

The curable composition contains a reactive compound (B) having a predetermined structure as components forming a cured material by being reacted with the above-described polymerizable compound (A). The reactive compound (B) is selected from the group consisting of a compound (B1) having one or more functional groups selected from a hydroxyl group and a carboxyl group (hereinafter, also noted as a hydroxyl group or carboxyl group-containing compound (B1)) and a polyvalent carboxylic anhydride (B2). Further, even in a case of a compound having one or more functional groups selected from a hydroxyl group and a carboxyl group or a compound having a carboxylic anhydride group, a compound containing an epoxy group or a vinyl ether group is set as the polymerizable compound (A).

Hereinafter, the hydroxyl group or carboxyl group-containing compound (B1) and the polyvalent carboxylic anhydride (B2) will be sequentially described.

Hydroxyl Group or Carboxyl Group-Containing Compound (B1)

The hydroxyl group or carboxyl group-containing compound (B1) is not particularly limited as long as the compound includes one or more functional groups selected from a hydroxyl group and a carboxyl group. The hydroxyl group or carboxyl group-containing compound (B1) may be a low molecular compound which is a non-polymer or may be a high molecular compound which is a polymer. Hereinafter, a non-polymer compound and a polymer compound will be described.

Non-Polymer Compound

The non-polymer compound is not particularly limited as long as the compound is a non-polymer compound having one or more functional groups selected from a hydroxyl group and a carboxyl group. That is, the non-polymer compound may be monovalent or polyvalent alcohol having one or more hydroxyl groups, monovalent or polyvalent carboxylic acid having one or more carboxyl groups, or hydroxy carboxylic acid having one or more hydroxyl groups and one or more carboxyl groups. A monovalent or polyvalent organic group which is a mother nucleus to which a hydroxyl group or a carboxyl group is bonded may be a hydrocarbon group or an organic group containing heteroatoms. Examples of the heteroatoms include 0, S, N, P, and a halogen atom. Further, the monovalent or polyvalent organic group which is a mother nucleus to which a hydroxyl group or a carboxyl group is bonded may be an aliphatic group or an aromatic group.

Specific examples of the monovalent or polyvalent alcohol include monovalent aliphatic alcohol such as methanol, ethanol, n-propanol, isopropanol, n-butanol, n-pentanol, n-hexanol, n-octanol, 2-methyl-n-hexanol, n-decanol, cyclohexanol, 2-methoxyethanol, 2-ethoxyethanol, propylene glycol monomethyl ether, propylene glycol monoethyl ether, diethylene glycol monomethyl ether, diethylene glycol monoethyl ether, dipropylene glycol monomethyl ether, or dipropylene glycol monoethyl ether; aromatic alcohol such as phenol, p-cresol, m-cresol, o-cresol, p-methoxyphenol, m-methoxyphenol, o-methoxyphenol, p-chlorophenol, m-chlorophenol, o-chlorophenol, 2,3-dimethylphenol, 2,4-dimethylphenol, 2,5-dimethylphenol, 2,6-dimethylphenol, 3,4-dimethylphenol, 3,5-dimethylphenol, 1-naphthol, 2-naphthol, 4-hydroxy-1,1'-biphenyl, 3-hydroxy-1,1'-biphenyl, 2-hydroxy-1,1'-biphenyl, benzylalcohol, 6-hydroxytetralin, or 5-hydroxytetralin; an aliphatic diol such as ethylene glycol, diethylene glycol, triethylene glycol, polyethylene glycol, propylene glycol, dipropylene glycol, tripropylene glycol, polypropylene glycol, 1,3-propanediol, 1,4-propanediol, 1,5-pentanediol, 1,6-hexanediol, 1,8-octanediol, 1,10-decanediol, 1,4-cyclohexanediol, or 1,4-cyclohexanedimethanol; an aromatic diol such as hydroquinone, resorcinol, catechol, 1,4-dihydroxynaphthalene, 1,3-dihydroxynaphthalene, 1,2-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, 4,4'-dihydroxybiphenyl, 3,3'-dihydroxybiphenyl, 2,2'-dihydroxybiphenyl, 3,4'- dihydroxybiphenyl, 2,3'-dihydroxybiphenyl, 2,4'-dihydroxybiphenyl, bisphenol A, 1,4-benzenedimethanol, 1,3-benzenedimethanol, 1,2-benzenedimethanol, or naphthalene-1,4-bismethanol; aliphatic polyol such as glycerin, diglycerol, trimethylol propane, trimethylol ethane, pentaerythritol, dipentaerythritol, sorbitol, mannitol, or sorbitan; and aromatic polyol such as pyrogallol, phloroglucinol, 1,2,4-trihydroxynaphthalene, 1,3,8-trihydroxynaphthalene, 1,4,5-trihydroxynaphthalene, 1,2,4,5-tetrahydroxynaphthalene, 1,3,6,8-tetrahydronaphthalene, 3,4,4'-trihydroxy-1,1-biphenyl, 3,3',4,4'-tetrahydroxy-1,1-biphenyl, or 3,3',5,5'-tetrahydroxy-1,1-biphenyl.

Specific examples of the monovalent or polyvalent carboxylic acid include aliphatic carboxylic acid such as formic acid, acetic acid, propionic acid, butanoic acid, pentanoic acid, hexanoic acid, heptanoic acid, octanoic acid, nonanoic acid, decanoic acid, 2-ethylhexanoic acid, acrylic acid, methacrylic acid, crotonic acid, arachidonic acid, oleic acid, linoleic acid, linolenic acid, stearic acid, monochloroacetic acid, dichloroacetic acid, trichloroacetic acid, or trifluoroacetic acid; aromatic carboxylic acid such as benzoic acid, 4-methyl benzoic acid, 3-methyl benzoic acid, 2-methyl benzoic acid, 4-methoxy benzoic acid, 3-methoxy benzoic acid, 2-methoxy benzoic acid, 4-chlorobenzoic acid, 3-chlorobenzoic acid, 2-chlorobenzoic acid, 1-naphthoic acid, 2-naphthoic acid, 4-carboxy-1,1'-biphenyl, 3-carboxy-1,1'-biphenyl, or 2-carboxy-1,1'-biphenyl; aliphatic dicarboxylic acid such as oxalic acid, malonic acid, methyl malonic acid, maleic acid, fumaric acid, adipic acid, sebacic acid, citraconic acid, mesaconic acid, or itaconic acid; aromatic dicarboxylic acid such as terephthalic acid, isophthalic acid, phthalic acid, 2,6-naphthalene dicarboxylic acid, or 4,4'-dicarboxy-1,1'-biphenyl; and aromatic polyvalent carboxylic acid such as pyromellitic acid, trimellitic acid, or mellitic acid.

Specific examples of hydroxy carboxylic acid include glycolic acid, lactic acid, 2-hydroxybutyric acid, 3-hydroxybutyric acid, 4-hydroxybutyric acid, gallic acid, shikimic acid, citric acid, tartaric acid, p-hydroxybenzoic acid, m-hydroxybenzoic acid, salicylic acid, 3-hydroxynaphthalene-6-carboxylic acid, 6-hydroxynaphthalene-2-carboxylic acid, 4-hydroxy-4'-carboxybiphenyl, oxalic acid mono-2-hydroxy ethyl ester, malonic acid mono-2-hydroxy ethyl ester, succinic acid mono-2-hydroxy ethyl ester, glutaric acid mono-2-hydroxy ethyl ester, and adipic acid mono-2-hydroxy ethyl ester.

Since a cured material with excellent mechanical characteristics is easily formed even in the condition of curing at a low temperature in a short period of time, other than the above-described non-polymer compounds, a compound having a (meth)acryloyl group in addition to one or more functional groups selected from a hydroxyl group and a carboxyl group is also preferable as the reactive compound (B).

As a preferred example of the non-polymer compound having a (meth)acryloyl group in addition to one or more functional groups selected from a hydroxyl group and a carboxyl group, a compound represented by the following formula (B1-1) can be exemplified.

(B1-1)

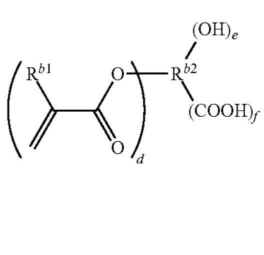

In the formula (B1-1), $R^{b1}$ represents a hydrogen atom or a methyl group; $R^{b2}$ represents a (d+e+f) valent organic group; d represents an integer of 1 to 3; e and f each represent an integer of 0 to 3; and (e+f) represents an integer of 1 or higher.

In a case where $R^{b2}$ is an organic group, the organic group may be an aliphatic group, an aromatic group, or a group obtained by combining an aliphatic group and an aromatic group. Further, the organic group may contain heteroatoms such as N, S, O, P, and a halogen atom. As $R^{b2}$, an aliphatic group which may contain an ether bond (—O—) or an ester bond (—CO—O—) is preferable from a viewpoint of easily and uniformly mixing components other than the reactive compound (B) contained in the curable composition, and the reactive compound (B). In a case where $R^{b2}$ is an aliphatic group which may contain an ether bond (—O—) or an ester bond (—CO—O—), the number of carbon atoms thereof, which is not particularly limited, is preferably in the range of 1 to 20, more preferably in the range of 1 to 12, and particularly preferably in the range of 1 to 8.

As an example of a combination of d, e, and f, it is preferable that d and e are 1 and f is 0, or d and f are 1 and e is 0.

Among the compounds represented by the formula (B1-1), a compound represented by the following formula (B1-2) or (B1-3) is preferable.

(B1-2)

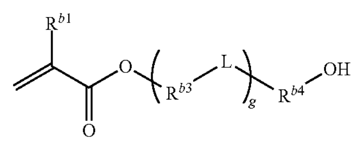

(B1-3)

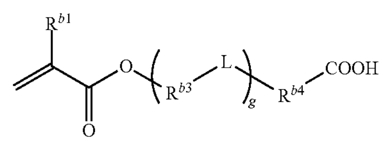

In the formulae (B1-2) and (B1-3), $R^{b1}$ represents a hydrogen atom or a methyl group; $R^{b3}$ and $R^{b4}$ represent an alkylene group having 1 to 20 carbon atoms; L represents —O—, —CO—O—, or —O—CO—, and g represents an integer of 0 to 5.

It is preferable that $R^{b3}$ and $R^{b4}$ in the formulae (B1-2) and (B1-3) represent an alkylene group having 1 to 10 carbon atoms and more preferable that $R^{b3}$ and $R^{b4}$ in the formulae (B1-2) and (B1-3) represent an alkylene group having 1 to 6 carbon atoms. Examples thereof include a methylene group, a 1,2-ethanediyl group, a 1,3-propanediyl group, a 1,2-propanediyl group, a 1,4-butanediyl group, a 1,5-pentanediyl group, and a 1,6-hexanediyl group.

It is preferable that g in the formulae (B1-2) and (B1-3) represents an integer of 0 to 3 and more preferable that g in the formulae (B1-2) and (B1-3) represents an integer of 0 or 1.

The non-polymer(meth)acryloyl compound having a hydroxyl group and a (meth)acryloyl group is typically produced by acylating at least one among plural hydroxyl groups included in various polyol compounds using an acylating agent that provides a (meth)acrylic acid halide such as (meth)acrylic acid chloride or a (meth)acryloyl group such as (meth)acrylic anhydride.

Further, the non-polymer(meth)acryloyl compound having a carboxyl group and a (meth)acryloyl group is produced by acylating all hydroxyl groups included in a compound respectively containing one or more hydroxyl groups and carboxyl groups using an acylating agent that provides the above-described (meth)acryloyl groups.

Further, the non-polymer(meth)acryloyl compound having a carboxyl group, a hydroxyl group, and a (meth) acryloyl group is produced by acylating some hydroxyl groups included in a compound containing two or more hydroxyl groups and one or more carboxyl groups using an acylating agent that provides the above-described (meth) acryloyl groups.

Among the non-polymer(meth)acryloyl compounds, a non-polymer(meth)acryloyl compound having a hydroxyl group and a (meth)acryloyl group or a non-polymer(meth) acryloyl compound having a carboxyl group and a (meth) acryloyl group is preferable from a viewpoint of ease of preparation or obtainment. The number of hydroxyl groups or carboxyl groups contained in such a preferable non-polymer(meth)acryloyl compound is preferably 1.

Among polyols used for preparing a non-polymer(meth) acryloyl compound having a hydroxyl group and a (meth) acryloyl group, a diol is preferable. As such a diol, an aliphatic diol which may contain an ether bond (—O—) or an ester bond (—CO—O—) is preferable.

Specific examples of the aliphatic diol include ethylene glycol, propylene glycol, 1,3-propanediol, 1,4-butanediol, 1,2-butanediol, 1,5-pentanediol, 1,6-hexanediol, diethylene glycol, triethylene glycol, tetraethylene glycol, dipropylene glycol, tripropylene glycol, 1,4-cyclohexanediol, and 1,4-cyclohexane dimethanol.

Among the compounds containing a hydroxyl group and a carboxyl group, used for preparing a non-polymer(meth) acryloyl compound having a carboxyl group and a (meth) acryloyl group, hydroxy acid having one hydroxyl group and one carboxyl group is preferable. As such a hydroxy acid, aliphatic hydroxy acid which may contain an ether bond (—O—) or an ester bond (—CO—O) is preferable.

Specific examples of the aliphatic hydroxy acid include glycolic acid, lactic acid, hydroxybutyric acid, oxalic acid mono-2-hydroxy ethyl ester, malonic acid mono-2-hydroxy ethyl ester, succinic acid mono-2-hydroxy ethyl ester, glutaric acid mono-2-hydroxy ethyl ester, and adipic acid mono-2-hydroxy ethyl ester.

Polymer Compound

The polymer compound is not particularly limited as long as the polymer includes one or more functional groups selected from a hydroxyl group and a carboxyl group.

Examples of the polymer having a hydroxyl group include polyhydroxystyrene, polyvinyl alcohol, and a novolac resin. Further, a polymer obtained by copolymerizing a monomer having an unsaturated bond and a hydroxyl group such as hydroxy styrene and 2-hydroxyethyl(meth)acrylate and a monomer having another unsaturated bond can be suitably used as the reactive compound (B). Examples or the monomer polymerized with a monomer having a hydroxyl group and an unsaturated bond include (meth)acrylic acid ester not containing an epoxy group, (meth)acrylic acid ester having a group with an alicyclic skeleton, (meth)acrylamides, an allyl compound, vinyl ethers, vinyl esters, and styrenes, which are described above in regard to the polymer having an epoxy group.

Examples of the polymer having a carboxyl group include a homopolymer of unsaturated carboxylic acid and a polymer obtained by copolymerizing unsaturated carboxylic acid and a monomer other than unsaturated carboxylic acid. Examples of the unsaturated carboxylic acid include (meth) acrylic acid, crotonic acid, maleic acid, fumaric acid, citraconic acid, mesaconic acid, and itaconic acid. Examples of the polymer other than unsaturated carboxylic acid include (meth)acrylic acid ester not containing epoxy groups, (meth) acrylic acid ester having a group with an alicyclic skeleton, (meth)acrylamides, an allyl compound, vinyl ethers, vinyl esters, and styrenes described above.

Further, since a cured material with excellent mechanical characteristics is easily formed even under the condition of curing at a low temperature in a short period of time, a polymer having a (meth)acryloyl group in addition to one or more functional groups selected from a hydroxyl group and a carboxyl group is also preferable as a polymer compound.

A method of producing a polymer compound having a (meth)acryloyl group is not particularly limited. For example, a polymer having a hydroxyl group and a (meth) acryloyl group can be obtained by reacting a polymer having a hydroxyl group, and a (meth)acrylic acid halide such as (meth)acrylic acid chloride or di(meth)acrylic anhydride.

In this case, as a polymer having a hydroxyl group, a copolymer of a monomer having an ethylenically unsaturated double bond and a hydroxyl group such as 2-hydroxyethyl(meth)acrylate or 2-hydroxy ethyl vinyl ether, and a monomer selected from the group consisting of (meth) acrylic acid ester not containing an epoxy group, (meth) acrylamides, an allyl compound, vinyl ethers, vinyl esters, and styrenes described as a monomer that provides a polymer having an epoxy group in regard to the epoxy compound (A1) can be preferably used.

In addition, a polymer having a carboxyl group and a (meth)acryloyl group can be obtained by reacting a polymer having a carboxyl group and (meth)acrylic acid ester having an epoxy group described in regard to the epoxy compound (A1).

In this case, as a polymer having a carboxyl group, a copolymer of monomers selected from the group consisting of unsaturated carboxylic acid, (meth)acrylic acid ester not containing an epoxy group, (meth)acrylamides, an allyl compound, vinyl ethers, vinyl esters, and styrenes which are described as monomers that provide a polymer having an epoxy group in regard to the epoxy compound (A1) can be preferably used.

Moreover, a polymer having a hydroxyl group, a carboxyl group, and a (meth)acryloyl group can be obtained by reacting a polymer having a carboxyl group and a hydroxyl group, and a (meth)acrylic acid halide such as (meth)acrylic acid chloride, di(meth)acrylic anhydride, or (meth)acrylic acid ester having an epoxy group which is described in regard to the epoxy compound (A1).

The molecular weight of the polymer compound described above is not particularly limited within a range that does not inhibit the purpose of the present invention, but the mass average molecular weight thereof in terms of polystyrene is preferable in the range of 3000 to 30000 and more preferably in the range of 5000 to 15000.

Polyvalent Carboxylic Anhydride (B2)

The polyvalent carboxylic anhydride (B2) can be suitably used by being selected from various acid anhydride compounds used as a curing agent for an epoxy resin in the related art. Specific examples of the polyvalent carboxylic anhydride (B2) include maleic anhydride, tetrahydrophthalic anhydride, hexahydrophthalic anhydride, methyl hexahydrophthalic anhydride, hexahydrotrimellitic anhydride, phthalic anhydride, trimellitic anhydride, and a styrene-maleic anhydride copolymer.

The content of the reactive compound (B) in the curable composition is preferably in the range of 30% by mass to 70% by mass and more preferably in the range of 40% by mass to 60% by mass based on the total mass of components other than the solvent (S) in the curable composition.

Compound (C) Represented by Formula (C1)

The curable composition provides a cured material with excellent mechanical characteristics in a short period of time even under the condition of curing at a low temperature by containing the above-described polymerizable compound (A) and reactive compound (B), and a compound (C) represented by the following formula (C1), and a compound (D) represented by the following formula (D1).

In a case where the compound represented by the following formula (C1) is heated, an imidazole compound represented by the following formula (C2) is released. It is considered that a cured material with excellent mechanical characteristics can be formed in a short period of time even under the condition of curing the curable composition at a low temperature by an imidazole compound represented by the following formula (C2) accelerating a reaction between the an epoxy group or a vinyl ether group included in the polymerizable compound (A) and a carboxyl group, a hydroxyl group, or an acid anhydride included in the reactive compound (B).

(C1)

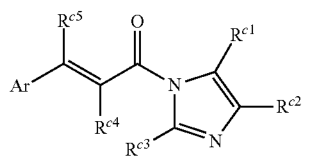

In the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent.

(C2)

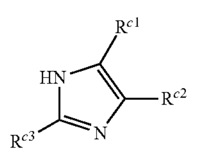

In the formula (C2), $R^{c1}$, $R^{c2}$, and $R^{c3}$ are the same as those in the formula (C1).

Examples of the organic group in $R^{c1}$, $R^{c2}$, and $R^{c3}$ in the formula (C1) include an alkyl group, an alkenyl group, a cycloalkyl group, a cycloalkenyl group, an aryl group, and an aralkyl group. The organic group may contain a bond or a substituent other than a hydrocarbon group such as heteroatoms in the organic group. Further, the organic group may be linear, branched, or cyclic. The organic group is typically monovalent, but may become bi- or higher valent in a case of forming a cyclic structure or the like.

$R^{c1}$ and $R^{c2}$ may form a cyclic structure by being bonded to each other and may further contain a bond of heteroatoms. The cyclic structure may be a condensed ring and examples thereof include a heterocycloalkyl group and a heteroaryl group.

A bond included in an organic group of $R^{c1}$, $R^{c2}$, and $R^{c3}$ is not particularly limited within a range that does not inhibit the effect of the present invention, and an organic group may contain a bond containing heteroatoms such as an oxygen atom, nitrogen atom, and a silicon atom. Specific examples of the bond containing heteroatoms include an ether bond, a thioether bond, a carbonyl bond, a thiocarbonyl bond, an ester bond, an amide bond, a urethane bond, an imino bond (—N═C(—R)—, —C(═NR)—: R represents a hydrogen atom or an organic group), a carbonate bond, a sulfonyl bond, a sulfinyl bond, and an azo bond.

As the bond containing heteroatoms which may be included in an organic group of $R^{c1}$, $R^{c2}$, and $R^{c3}$, an ether bond, a thioether bond, a carbonyl bond, a thiocarbonyl bond, an ester bond, an amide bond, a urethane bond, an imino bond (—N═C(—R)—, —C(═NR)—: R represents a hydrogen atom or an monovalent organic group), a carbonate bond, a sulfonyl bond, or a sulfinyl bond is preferable from a viewpoint of heat resistance of the imidazole compound.

In a case where $R^{c1}$, $R^{c2}$, and $R^{c3}$ represent a substituent other than a hydrocarbon group, $R^{c1}$, $R^{c2}$, and $R^{c3}$ are not particularly limited within a range that does not inhibit the effect of the present invention. Specific examples of $R^{c1}$, $R^{c2}$, and $R^{c3}$ include a halogen atom, a hydroxyl group, a mercapto group, a sulfide group, a cyano group, an isocyano group, a cyanate group, an isocyanate group, a thiocyanate group, an isothiocyanate group, a silyl group, a silanol group, an alkoxy group, an alkoxycarbonyl group, a carbamoyl group, a thiocarbamoyl group, a nitro group, a nitroso group, a carboxylate group, an acyl group, an acyloxy group, a sulfino group, a sulfonate group, a phosphino group, a phosphinyl group, a phosphonate group, an alkylether group, an alkenylether group, an alkylthioether group, an alkenylthioether group, an arylether group, and an arylthioether group. A hydrogen atom contained in the above-described substituents may be substituted with a hydrocarbon group. Further, the hydrocarbon group contained in the above-described substituent may be linear, branched, or cyclic.

As $R^{c1}$, $R^{c2}$, and $R^{c3}$, a hydrogen atom, an alkyl group having 1 to 12 carbon atoms, an aryl group having 1 to 12 carbon atoms, an alkoxy group having 1 to 12 carbon atoms, and a halogen atom are preferable and a hydrogen atom is more preferable.

In the formula (C1), $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group.

As organic groups in $R^{c4}$ and $R^{c5}$, the organic groups described in regard to $R^{c1}$, $R^{c2}$, and $R^{c3}$ can be also exemplified. These organic groups may contain heteroatoms similar to the case of $R^{c1}$, $R^{c2}$, and $R^{c3}$. In addition, the organic groups may be linear, branched, or cyclic.

In the formula (C1), Ar represents an aromatic group which may have a substituent. The aromatic group may be an aromatic hydrocarbon group or an aromatic heterocyclic group. Examples of the aromatic group include a phenyl group, a naphthyl group, a biphenylyl group, an anthryl group, a phenanthrenyl group, a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzimidazolyl group. Among these aromatic groups, a phenyl group and a thienyl group are preferable.

Specific examples of the substituent which may be included in an aromatic group are the same as those of $R^{c1}$, $R^{c2}$, and $R^{c3}$.

As a preferable compound among the compounds represented by the formula (C1), a compound represented by the following formula (C3) can be exemplified.

(C3)

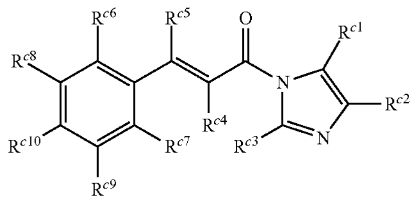

In the formula (C3), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group. $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group. $R^{c6}$, $R^{c7}$, $R^{c8}$, $R^{c9}$, and $R^{c10}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, an amino group, an ammonio group, or an organic group. $R^{c6}$, $R^{c7}$, $R^{c8}$, $R^{c9}$, and $R^{c10}$ may form a cyclic structure by two or more thereof being bonded to each other and may contain a bond of heteroatoms.

In the formula (C3), $R^{c1}$, $R^{c2}$, and $R^{c3}$ are the same as those described in regard to the formula (C1).

In the formula (C3), $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phophino group, a phosphinyl group, a phosphono group, a phosphonate group, or an organic group.

Organic groups in $R^{c4}$ and $R^{c5}$ are the same as those exemplified in regard to $R^{c1}$, $R^{c2}$, and $R^{c3}$. The organic groups may contain heteroatoms similar to the case of $R^{c1}$, $R^{c2}$, and $R^{c3}$. In addition, the organic groups may be linear, branched, or cyclic.

Among the organic groups, it is preferable that $R^{c4}$ and $R^{c5}$ each independently represent a hydrogen atom, an alkyl group having 1 to 10 carbon atoms, a cycloalkyl group having 4 to 13 carbon atoms, a cycloalkenyl group having 4 to 13 carbon atoms, an aryloxyalkyl group having 7 to 16 carbon atoms, an aralkyl group having 7 to 20 carbon atoms, an alkyl group having a cyano group and 2 to 11 carbon atoms, an alkyl group having a hydroxyl group and 1 to 10 carbon atoms, an alkoxy group having 1 to 10 carbon atoms, an amide group having 2 to 11 carbon atoms, an alkylthio group having 1 to 10 carbon atoms, an acyl group having 1 to 10 carbon atoms, an ester group having 2 to 11 carbon atoms (—COOR, —OCOR: R represents a hydrocarbon group), an aryl group having 6 to 20 carbon atoms, an aryl group substituted with an electron donating group and/or an electron withdrawing group and which has 6 to 20 carbon atoms, a benzyl group substituted with an electron donating group and/or an electron withdrawing group, a cyano group, or a methylthio group. It is more preferable that both of $R^{c4}$ and $R^{c5}$ represent a hydrogen atom or $R^{c4}$ represents a methyl group and $R^{c5}$ represents a hydrogen atom.

In the formula (C3), $R^{c6}$, $R^{c7}$, $R^{c8}$, $R^{c9}$, and $R^{c10}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, an amino group, an ammonio group, or an organic group.

Organic groups in $R^{c6}$, $R^{c7}$, $R^{c8}$, $R^{c9}$, and $R^{c10}$ are the same as those exemplified in regard to $R^{c1}$, $R^{c2}$, and $R^{c3}$. The organic groups may contain a substituent or a bond other than a hydrocarbon group such as heteroatoms similar to the case of $R^{c1}$ and $R^{c2}$. In addition, the organic groups may be linear, branched, or cyclic.

$R^{c6}$, $R^{c7}$, $R^{c8}$, $R^{c9}$, and $R^{c10}$ may form a cyclic structure by two or more thereof being bonded to each other or may contain a bond of heteroatoms. The cyclic structure may be a condensed ring and examples thereof include a heterocycloalkyl group and a heteroaryl group. For example, two or more of $R^{c6}$, $R^{c7}$, $R^{c8}$, $R^{c9}$, and $R^{c10}$ may be bonded to each other and $R^{c6}$, $R^{c7}$, $R^{c8}$, $R^{c9}$, and $R^{c10}$ may share atoms of a benzene ring to which $R^{c6}$, $R^{c7}$, $R^{c8}$, $R^{c9}$, and $R^{c10}$ are bonded to form a condensed ring such as naphthalene, anthracene, phenanthrene, or indene.

Among these, it is preferable that $R^{c6}$, $R^{c7}$, $R^{c8}$, $R^{c9}$, and $R^{c10}$ each independently represent a hydrogen atom, an alkyl group having 1 to 10 carbon atoms, a cycloalkyl group having 4 to 13 carbon atoms, a cycloalkenyl group having 4 to 13 carbon atoms, an aryloxyalkyl group having 7 to 16 carbon atoms, an aralkyl group having 7 to 20 carbon atoms, an alkyl group having a cyano group and 2 to 11 carbon atoms, an alkyl group having a hydroxyl group and 1 to 10 carbon atoms, an alkoxy group having 1 to 10 carbon atoms, an amide group having 2 to 11 carbon atoms, an alkylthio group having 1 to 10 carbon atoms, an acyl group having 1 to 10 carbon atoms, an ester group having 2 to 11 carbon atoms, an aryl group having 6 to 20 carbon atoms, an aryl group substituted with an electron donating group and/or an electron withdrawing group and which has 6 to 20 carbon atoms, a benzyl group substituted with an electron donating group and/or an electron withdrawing group, a cyano group, a methylthio group, or a nitro group.

Further, in regard to $R^{c6}$, $R^{c7}$, $R^{c8}$, $R^{c9}$, and $R^{c10}$, it is preferable that two or more of $R^{c6}$, $R^{c7}$, $R^{c8}$, $R^{c9}$, and $R^{c10}$ are bonded to each other and $R^{c6}$, $R^{c7}$, $R^{c8}$, $R^{c9}$, and $R^{c10}$ share atoms of a benzene ring to which $R^{c6}$, $R^{c7}$, $R^{c8}$, $R^{c9}$, and $R^{c10}$ are bonded to form a condensed ring such as naphthalene, anthracene, phenanthrene, or indene in terms that an absorption wavelength becomes longer.

Among the compounds represented by the formula (C3), a compound represented by the following formula (C4) is preferable.

(C4)

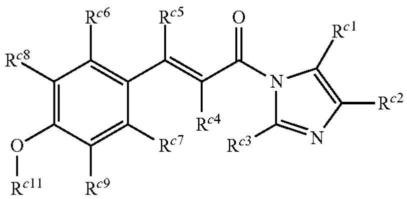

In the formula (C4), $R^{c1}$, $R^{c2}$, and $R^{c3}$ have the same definitions as those of the formulae (C1) and (C3). $R^{c4}$ to $R^{c9}$ have the same definition as those of the formula (C3). $R^{c11}$ represents a hydrogen atom or an organic group. $R^{c6}$ and $R^{c7}$ do not represent a hydroxyl group. $R^{c6}$, $R^{c7}$, $R^{c8}$, and $R^{c9}$ may form a cyclic structure by two or more thereof being bonded to each other or may contain a bond of heteroatoms.

Since the compound represented by the formula (C4) has a substituent —O—$R^{c11}$, the compound is easily and uniformly dissolved in the curable composition.

In the formula (C4), $R^{c11}$ represents a hydrogen atom or an organic group. In a case where $R^{c11}$ represents an organic group, examples of the organic group are the same as those exemplified in regard to $R^{c1}$, $R^{c2}$, and $R^{c3}$. The organic group may contain heteroatoms. Further, the organic group may be linear, branched, or cyclic. As $R^{c11}$, a hydrogen atom or an alkyl group having 1 to 12 carbon atoms is preferable and a methyl group is more preferable.

Specific examples of particularly preferable compounds among the compounds represented by the formula (C1) are as follows.

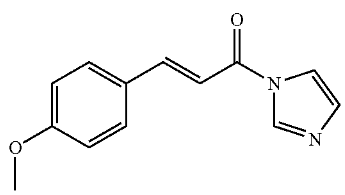

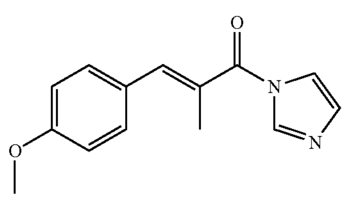

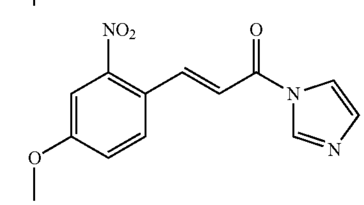

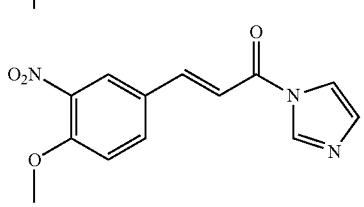

-continued

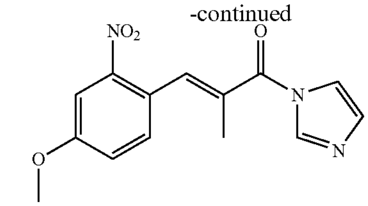

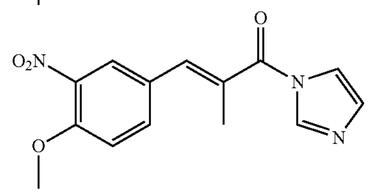

The content of the compound (C) represented by the formula (C1) in the curable composition is not particularly limited within a range that does not inhibit the purpose of the present invention. The content of the compound (C) represented by the formula (C1) in the curable composition is preferably in the range of 0.1% by mass to 10% by mass and more preferably in the range of 0.5% by mass to 3.0% by mass based on the total mass of the components other than the solvent (S) in the curable composition.

Compound (D) Represented by Formula (D1)

The curable composition provides a cured material with excellent mechanical characteristics in a short period of time even under the condition of curing at a low temperature by containing the above-described polymerizable compound (A), reactive compound (B), and compound (C) represented by the following formula (C1), and a compound (D) represented by the following formula (D1).

When the compound represented by the formula (D1) is heated, radicals are generated and a polymerization reaction between (meth)acryloyl groups included in the reactive compound (B) described above proceeds. In this manner, it is considered that a cured material with excellent mechanical characteristics can be formed in a short period of time even when the curable composition is cured at a low temperature.

(D1)

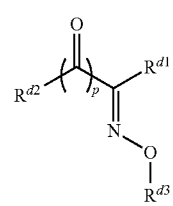

In the formula (D1), $R^{d1}$ represents an aliphatic hydrocarbon group having 1 to 10 carbon atoms which may have a substituent or an aryl group which may have a substituent; $R^{d2}$ represents an aliphatic hydrocarbon group having 1 to 10 carbon atoms or an aryl group which may have a substituent; $R^{d3}$ represents a hydrogen atom or a group represented by —CO—$R^{d5}$; and $R^{d5}$ represents an alkyl group having 1 to 6 carbon atoms or an aryl group which may have a substituent.

In a case where $R^{d1}$ in the formula (D1) is an aryl group which may have a substituent, examples of the aryl group which may have a substituent include a phenyl group which may have a substituent, a naphthyl group which may have a substituent, an anthryl group which may have a substituent, and a phenanthrenyl group which may have a substituent.

Among these groups, a phenyl group which may have a substituent or a naphthyl group which may have a substituent is preferable and a phenyl group which may have a substituent is more preferable.

In a case where an aryl group has a substituent, the number of substituents bonded to the aryl group is not particularly limited. In a case where an aryl group has plural substituents, the plural substituents may be the same as or different from one another. The kinds of substituents which may be included in an aryl group are not particularly limited within a range that does not inhibit the purpose of the present invention. Preferred examples of the substituents include an organic group, an amino group, halogen, a nitro group, and a cyano group.

In a case where the substituent is an organic group, the kind of the organic group is not particularly limited within a range that does not inhibit the purpose of the present invention and the organic group is suitably selected from various organic groups. Preferred examples of the organic group include an alkyl group, an alkoxy group, a cycloalkyl group, a cycloalkoxy group, a saturated aliphatic acyl group, an alkoxycarbonyl group, a saturated aliphatic acyloxy group, a phenyl group which may have a substituent, a phenoxy group which may have a substituent, a benzoyl group which may have a substituent, a phenoxycarbonyl group which may have a substituent, a benzoyloxy group which may have a substituent, a phenylalkyl group which may have a substituent, a naphthyl group which may have a substituent, a naphthoxy group which may have a substituent, a naphthoyl group which may have a substituent, a naphthoxycarbonyl group which may have a substituent, a naphthoyloxy group which may have a substituent, a naphthylalkyl group which may have a substituent, a heterocyclyl group which may have a substituent, an amino group which is substituted with 1 or 2 organic groups, a morpholine-1-yl group, and a piperazine-1-yl group. The number of carbon atoms of the substituent does not include the number of carbon atoms of a substituent that the substituent further includes.

In a case where the organic group is an alkyl group, the number of carbon atoms thereof is preferably in the range of 1 to 20 and more preferably in the range of 1 to 6. Further, in the case where the organic group is an alkyl group, the organic group may be linear or branched. In the case where the organic group is an alkyl group, specific examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, and an isodecyl group. In addition, in the case where the organic group is an alkyl group, the alkyl group may contain an ether bond (—O—) in a carbon chain. Examples of the alkyl group having an ether bond in a carbon chain include a methoxyethyl group, an ethoxyethyl group, a methoxyethoxyethyl group, an ethoxyethoxyethyl group, a propyloxyethoxyethyl group, and a methoxypropyl group.

In a case where the organic group is an alkoxy group, the number of carbon atoms thereof is preferably in the range of 1 to 20 and more preferably in the range of 1 to 6. Further, in the case where the organic group is an alkoxy group, the organic group may be linear or branched. In the case where the organic group is an alkoxy group, specific examples of the alkoxy group include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, and an isodecyloxy group. Further, in the case where the organic group is an alkoxy group, the alkoxy group may contain an ether bond (—O—) in a carbon chain. Examples of the alkoxy group having an ether bond in a carbon chain include a methoxyethoxy group, an ethoxyethoxy group, a methoxyethoxyethoxy group, an ethoxyethoxyethoxy group, a propyloxyethoxyethoxy group, and a methoxypropyloxy group.

In a case where the organic group is a cycloalkyl group or a cycloalkoxy group, the number of carbon atoms thereof is preferably in the range of 3 to 10 and more preferably in the range of 3 to 6. In the case where the organic group is a cycloalkyl group, specific examples of the cycloalkyl group include a cyclopropyl group, a cyclobutyl group, a cyclopentyl group, a cyclohexyl group, a cycloheptyl group, and a cyclooctyl group. In the case where the organic group is a cycloalkoxy group, specific examples of the cycloalkoxy group include a cyclopropyloxy group, a cyclobutyloxy group, a cyclopentyloxy group, a cyclohexyloxy group, a cycloheptyloxy group, and a cyclooctyloxy group.

In a case where the organic group is a saturated aliphatic acyl group or a saturated aliphatic acyloxy group, the number of carbon atoms thereof is preferably in the range of 2 to 20 and more preferably in the range of 2 to 7. In the case where the organic group is a saturated aliphatic acyl group, specific examples of the saturated aliphatic acyl group include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, and an n-hexadecanoyl group. In the case where the organic group is a saturated aliphatic acyloxy group, specific examples of the saturated aliphatic acyloxy group include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, and n-hexadecanoyloxy group.

In a case where the organic group is an alkoxycarbonyl group, the number of carbon atoms thereof is preferably in the range of 2 to 20 and more preferably in the range of 2 to 7. In the case where the organic group is an alkoxycarbonyl group, specific examples of the alkoxycarbonyl group include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, and an isodecyloxycarbonyl group.

In a case where the organic group is a phenylalkyl group, the number of carbon atoms thereof is preferably in the range of 7 to 20 and more preferably in the range of 7 to 10. In addition, in a case where the organic group is a naphthylalkyl group, the number of carbon atoms thereof is preferably in the range of 11 to 20 and more preferably in the range of 11 to 14. In the case where the organic group is a phenylalkyl group, specific examples of the phenylalkyl group include a benzyl group, a 2-phenylethyl group, a 3-phenylpropyl group, and a 4-phenylbutyl group. In the case where the organic group is a naphthylalkyl group, specific examples of the naphthylalkyl group include an α-naphthylmethyl group, a β-naphthylmethyl group, a 2-(α-naphthyl)ethyl group, and a 2-(β-naphthyl)ethyl group. In the case where the organic group is a phenylalkyl group or a naphthylalkyl group, the organic group may further have a substituent on a phenyl group or a naphthyl group.

In a case where the organic group is a heterocyclyl group, the heterocyclyl group is a 5- or 6-membered single ring containing one or more Ns, Ss, or Os or a heterocyclyl group in which such single rings or such a single ring and a benzene ring are condensed. In the case where the heterocyclyl group is a condensed ring, the number of rings is set to be 3 or less. Examples of the heterocyclic ring constituting such a heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, and quinoxaline. In the case where the organic group is a heterocyclyl group, the heterocyclyl group may further have a substituent.

In a case where the organic group is an amino group which is substituted with one or two organic groups, preferred examples of the organic group bonded to a nitrogen atom include an alkyl group having 1 to 20 carbon atoms, a cycloalkyl group having 3 to 10 carbon atoms, a saturated aliphatic acyl group having 2 to 20 carbon atoms, a phenyl group which may have a substituent, a benzoyl group which may have a substituent, a phenylalkyl group having 7 to 20 carbon atoms which may have a substituent, a naphthyl group which may have a substituent, a naphthoyl group which may have a substituent, a naphthylalkyl group having 11 to 20 carbon atoms which may have a substituent, and a heterocyclyl group. In a case where $R^{d1}$ represents an aryl group which may have a substituent, specific examples of preferable organic groups are the same as those of the organic groups which may be included in the aryl group as substituents. Specific examples of the amino group which is substituted with one or two organic groups include a methylamino group, a dimethylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, a propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, and a β-naphthoylamino group.

In a case where $R^{d1}$ is an aryl group which may have a substituent, examples of the substituent in a case where a phenyl group, a naphthyl group, and a heterocyclyl group which are included in an organic group bonded to an aryl group as a substituent further have a substituent include an alkyl group having 1 to 6 carbon atoms, an alkoxy group having 1 to 6 carbon atoms, a saturated aliphatic acyl group having 2 to 7 carbon atoms, an alkoxycarbonyl group having 2 to 7 carbon atoms, a saturated aliphatic acyloxy group having 2 to 7 carbon atoms, a monoalkylamino group which includes an alkyl group having 1 to 6 carbon atoms, a dialkylamino group which includes an alkyl group having 1 to 6 carbon atoms, a morpholine-1-yl group, a piperazine-1-yl group, halogen, a nitro group, and a cyano group.

In a case where $R^{d1}$ represents an aryl group which may have a substituent, when a phenyl group, a naphthyl group, and a heterocyclyl group which are included in an organic group bonded to an aryl group as a substituent further have a substituent, the number of substituents is not particularly limited within a range that does not inhibit the purpose of the present invention, but is preferably in the range of 1 to 4. In the case where $R^{d1}$ represents an aryl group which may include a substituent, when a phenyl group, a naphthyl group, and a heterocyclyl group which are included in an organic group bonded to an aryl group as a substituent have plural substituents, the plural substituents may be the same as or different from one another.

In the case where $R^{d1}$ represents an aryl group which may have a substituent, as a substituent included in an aryl group, a group selected from the group consisting of a nitro group, an alkyl group having 1 to 6 carbon atoms, an alkoxy group having 1 to 6 carbon atoms, and a saturated aliphatic acyl group having 2 to 7 carbon atoms is preferable, a nitro group or an alkyl group having 1 to 6 carbon atoms is more preferable, and a nitro group or a methyl group is particularly preferable in terms of chemical stability of the substituent, less steric hindrance, ease of synthesis of the compound represented by the formula (D1), and high solubility in a solvent of the compound represented by the formula (D1).

In the case where $R^{d1}$ represents an aryl group which may have a substituent, $R^{d1}$ preferably represents a compound represented by the following formula (D1-1).

(D1-1)

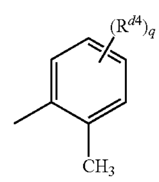

In the formula (D1-1), $R^{d4}$ represents a group selected from the group consisting of an organic group, an amino group, halogen, a nitro group, and a cyano group and q represents an integer of 0 to 4.

In a case where $R^{d4}$ represents an organic group, preferred examples of the organic group are the same as those of the organic groups which may be included in the aryl group as substituents when $R^{d1}$ represents an aryl group which may have a substituent.

As a position in which $R^{d4}$ is bonded to a phenyl group, in regard to a phenyl group to which $R^{d4}$ is bonded, when the position of a bond between a phenyl group and a main skeleton of an oxime ester compound is set as a 1-position and the position of a methyl group is set as a 2-position, a 4-position or a 5-position is preferable and a 5-position is more preferable. Further, q represents preferably an integer of 0 to 3, more preferably an integer of 0 to 2, and particularly preferably 0 or 1.

In the formula (D1), in a case where $R^{d1}$ represents an aliphatic hydrocarbon group which may include a substituent, the number of carbon atoms thereof is in the range of 1 to 10. The number of carbon atoms thereof does not include the number of carbon atoms of a substituent. The number of carbon atoms of the aliphatic hydrocarbon group is preferably in the range of 1 to 9 and more preferably in the range of 1 to 8. The aliphatic hydrocarbon group may be a saturated aliphatic hydrocarbon group or a hydrocarbon group having an unsaturated bond. The structure of the aliphatic hydrocarbon group may be linear, branched, cyclic, or a structure obtained by combining these structures, and the structure thereof is preferably linear.

In the formula (D1), in a case where $R^{d1}$ represents a linear aliphatic hydrocarbon group, preferred examples thereof include a methyl group, an ethyl group, an n-propyl group, an n-butyl group, an n-pentyl group, an n-hexyl group, an n-heptyl group, an n-octyl group, an n-nonyl group, and an n-decyl group.

In a case where $R^{d1}$ represents a cyclic aliphatic hydrocarbon group, preferred examples thereof include a cyclopentyl group and a cyclohexyl group.

In a case where $R^{d1}$ has a structure obtained by combining a linear aliphatic hydrocarbon group and a cyclic aliphatic hydrocarbon group, preferred examples thereof include a cyclohexylmethyl group, a cylopentylmethyl group, a 2-cyclohexylethyl group, a 2-cyclopentylethyl group, a 3-cyclohexyl-n-propyl group, and a 3-cyclopentyl-n-propyl group, and, among these groups, a 2-cyclohexylethyl group and a 2-cyclopentylethyl group are preferable.

In a case where $R^{d1}$ represents an aliphatic hydrocarbon group, examples of the substituent which may be included in the aliphatic hydrocarbon group include a hydroxyl group, halogen, a cyano group, an alkoxy group having 1 to 10 carbon atoms, an alkylthio group having 1 to 10 carbon atoms, an aryl group which may have a substituent, an aryloxy group which may have a substituent, an arylthio group which may have a substituent, a saturated aliphatic acyl group having 2 to 10 carbon atoms, an arylcarbonyl group which may have a substituent, an amino group, an amino group which is substituted with one or two alkyl groups having 1 to 6 carbon atoms, and an amino group which is substituted with an aryl group which may have one or two substituents. In addition, the number of carbon atoms of these substituents is not included in the number of carbon atoms of the aliphatic hydrocarbon group.

In a case where the substituent included in an aliphatic hydrocarbon group is an aryl group which may have a substituent, an aryloxy group which may have a substituent, an arylthio group which may have a substituent, an arylcarbonyl group which may have a substituent, or an amino group which is substituted with an aryl group which may have one or two substituents, examples of the aryl group contained in these groups include a phenyl group, a naphthyl group, an anthryl group, and a phenanthryl group. Among these, a phenyl group and a naphthyl group are preferable and a phenyl group is more preferable.

In the case where the substituent included in an aliphatic hydrocarbon group is an aryl group which may have a substituent, an aryloxy group which may have a substituent, an arylthio group which may have a substituent, an arylcarbonyl group which may have a substituent, or an amino group which is substituted with an aryl group which may have one or two substituents, examples of the substituent which may be included in an aryl group contained in these groups include a hydroxyl group, halogen, a cyano group, a nitro group, an alkyl group having 1 to 6 carbon atoms, an alkoxy group having 1 to 6 carbon atoms, and a saturated aliphatic acyl group having 2 to 7 carbon atoms.

Specific examples of the substituents described above as substituents which may be included in an aliphatic hydrocarbon group in the case where $R^{d1}$ represents an aliphatic hydrocarbon group are the same as those which may be included in an aryl group in the case where $R^{d1}$ represents an aryl group in the range of the number of carbon atoms described above.

$R^{d2}$ represents an aliphatic hydrocarbon group having 1 to 10 carbon atoms or an aryl group which may have a substituent.

In a case where $R^{d2}$ represents an aliphatic hydrocarbon group, the number of carbon atoms of the aliphatic hydrocarbon group is preferably in the range of 1 to 6 and more preferably 1. The aliphatic hydrocarbon group may be a saturated aliphatic hydrocarbon group or a hydrocarbon group having an unsaturated bond. The structure of the aliphatic hydrocarbon group may be linear, branched, cyclic, or a structure obtained by combining these structures, and the structure thereof is preferably linear.

In a case where $R^{d2}$ represents a linear aliphatic hydrocarbon group, preferred examples thereof include a methyl group, an ethyl group, an n-propyl group, an n-butyl group, an n-pentyl group, an n-hexyl group, an n-heptyl group, an n-octyl group, an n-nonyl group, and an n-decyl group. Among these, a methyl group is particularly preferable.

In a case where $R^{d2}$ represents an aryl group which may have a substituent, examples thereof include a phenyl group which may have a substituent, a naphthyl group which may have a substituent, an anthryl group which may have a substituent, and a phenanthrenyl group which may have a substituent. Among these groups, a phenyl group which may have a substituent or a naphthyl group which may have a substituent is preferable and a phenyl group which may have a substituent is more preferable.

In regard to $R^{d2}$, the substituent included in an aryl group is not particularly limited within a range that does not inhibit the purpose of the present invention. Examples of preferable substituent which an aryl group may include on a carbon atom include an alkyl group having 1 to 20 carbon atoms, an alkoxy group having 1 to 20 carbon atoms, a cycloalkyl group having 3 to 10 carbon atoms, a cycloalkoxy group having 3 to 10 carbon atoms, a saturated aliphatic acyl group having 2 to 20 carbon atoms, an alkoxycarbonyl group having 2 to 20 carbon atoms, a saturated aliphatic acyloxy group having 2 to 20 carbon atoms, a phenyl group which may have a substituent, a phenoxy group which may have a substituent, a phenylthio group which may have a substituent, a benzoyl group which may have a substituent, a phenoxycarbonyl group which may have a substituent, a benzoyloxy group which may have a substituent, a phenylalkyl group having 7 to 20 carbon atoms which may have a substituent, a naphthyl group which may have a substituent, a naphthoxy group which may have a substituent, a naphthoyl group which may have a substituent, a naphthoxycarbonyl group which may have a substituent, a naphthoyloxy group which may have a substituent, a naphthylalkyl group having 11 to 20 carbon atoms which may have a substituent, a heterocyclyl group which may have a substituent, a heterocyclylcarbonyl group which may have a substituent, an amino group, an amino group which is substituted with one or two organic groups, a morpholine-1-yl group, a piperazine-1-yl group, halogen, a nitro group, and a cyano group.

In a case where $R^{d1}$ represents an aryl group which may have a substituent, specific examples of the substituent which may be included in an aryl group are the same as those which may be included in an aryl group exemplified above related to an alkyl group, an alkoxy group, a cycloalkyl group, a cyloalkoxy group, a saturated aliphatic acyl group, an alkoxycarbonyl group, a saturated aliphatic acyloxy group, a phenylalkyl group which may have a substituent, a naphthylalkyl group which may have a substituent, a heterocyclyl group which may have a substituent, and an amino group which is substituted with one or two organic groups.

In regard to $R^{d2}$, in a case where a phenyl group, a naphthyl group, and a heterocyclyl group which are contained in a substituent included in an aryl group further have a substituent, examples of the substituent include an alkyl group having 1 to 6 carbon atoms, an alkoxy group having 1 to 6 carbon atoms, a saturated aliphatic acyl group having 2 to 7 carbon atoms, an alkoxycarbonyl group having 2 to 7 carbon atoms, a saturated aliphatic acyloxy group having 2 to 7 carbon atoms, a phenyl group, a naphthyl group, a benzoyl group, a naphthoyl group, a benzoyl group substituted with a group selected from the group consisting of an alkyl group having 1 to 6 carbon atoms, a morpholine-1-yl group, a piperazine-1-yl group, and a phenyl group, a monoalkylamino group which has an alkyl group having 1 to 6 carbon atoms, a dialkylamino group which has an alkyl group having 1 to 6 carbon atoms, a morpholine-1-yl group, a piperazine-1-yl group, halogen, a nitro group, and a cyano group. In the case where a phenyl group, a naphthyl group, and a heterocyclyl group contained in a substituent included in an aryl group further have substituents, the number of the substituents is not particularly limited within a range that does not inhibit the purpose of the present invention, but the number thereof is preferably in the range of 1 to 4. In the case where a phenyl group, a naphthyl group, and a heterocyclyl group have plural substituents, the plural substituents may be the same as or different from one another.

In terms of rapid curability of the curable composition, it is preferable that $R^{d2}$ represents a group represented by the following formula (D1-2) and more preferable that $R^{d2}$ represents a group represented by the following formula (D1-2) in which A represents S.

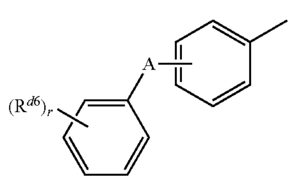

(D1-2)

In the formula (D1-2), $R^{d6}$ represents a group selected from the group consisting of a monovalent organic group, an amino group, halogen, a nitro group, and a cyano group; A represents S or O; and r represents an integer of 0 to 4.

In a case where $R^{d6}$ in the formula (D1-2) represents an organic group, the organic group can be selected from various organic groups within a range that does not inhibit the purpose of the present invention. In the case where $R^{d6}$ in the formula (D1-2) represents an organic group, preferred examples of the organic group include an alkyl group having 1 to 6 carbon atoms, an alkoxy group having 1 to 6 carbon atom, a saturated aliphatic acyl group having 2 to 7 carbon atoms, an alkoxycarbonyl group having 2 to 7 carbon atoms, a saturated aliphatic acyloxy group having 2 to 7 carbon atoms, a phenyl group, a naphthyl group, a benzoyl group, a naphthoyl group, a benzoyl group which is substituted with a group selected from the group consisting of an alkyl group having 1 to 6 carbon atoms, a morpholine-1-yl group, a piperazine-1-yl group, and a phenyl group, a monoalkylamino group which includes an alkyl group having 1 to 6 carbon atoms, a dialkylamino group which includes an alkyl group having 1 to 6 carbon atoms, a morpholine-1-yl group, a piperazine-1-yl group, halogen, a nitro group, and a cyano group.

In regard to $R^{d6}$, a benzoyl group, a naphthoyl group, a benzoyl group which is substituted with a group selected from the group consisting of an alkyl group having 1 to 6 carbon atoms, a morpholine-1-yl group, a piperazine-1-yl group, and a phenyl group, or a nitro group is preferable and a benzoyl group, a naphthoyl group, a 2-methylphenylcarbonyl group, a 4-(piperazine-1-yl)phenylcarbonyl group, or a 4-(phenyl)phenylcarbonyl group is more preferable.

Further, in the formula (D1-2), r represents preferably an integer of 0 to 3, more preferably an integer of 0 to 2, and particularly preferably 0 or 1. In a case where r represents 1, the position to which $R^{d6}$ is bonded is preferably the para-position with respect to a bond between a phenyl group to which $R^{d6}$ is bonded and an oxygen atom or a sulfur atom.

In a case where a phenyl group, a naphthyl group, and a heterocyclyl group which are contained in $R^{d6}$ further have a substituent, examples of the substituent include an alkyl group having 1 to 6 carbon atoms, an alkoxy group having 1 to 6 carbon atoms, a saturated aliphatic acyl group having 2 to 7 carbon atoms, an alkoxycarbonyl group having 2 to 7 carbon atoms, a saturated aliphatic acyloxy group having 2 to 7 carbon atoms, a monoalkylamino group which includes an alkyl group having 1 to 6 carbon atoms, a dialkylamino group which includes an alkyl group having 1 to 6 carbon atoms, a morpholine-1-yl group, a piperazine-1-yl group, halogen, a nitro group, and a cyano group. In a case where a phenyl group, a naphthyl group, and a heterocyclyl group which are contained in $R^{d6}$ further have a substituent, the number of substituents is not particularly limited within a range that does not inhibit the purpose of the present invention, but is preferably in the range of 1 to 4. In the case where a phenyl group, a naphthyl group, and a heterocyclyl group which are contained in $R^{d6}$ have plural substituents, the plural substituents may be the same as or different from one another.

$R^{d3}$ in the formula (D1) represents a hydrogen atom or a group represented by —CO—$R^{d5}$. In the group represented by —CO—$R^{d5}$, $R^{d5}$ represents an alkyl group having 1 to 6 carbon atoms or an aryl group which may have a substituent. In a case where $R^{d5}$ represents an aryl group which may have a substituent, the substituent which may be included in an aryl group is the same as that which may be included in the aryl group when $R^{d1}$ described above represents an aryl group which may have a substituent. In the case where $R^{d5}$ represents an aryl group which may have a substituent, the aryl group may have two or more substituents. In this case, the substituents included in the aryl group may be the same as or different from one another. As $R^{d5}$, a hydrogen atom, an acetyl group, a propionyl group, or a benzoyl group is preferable and a hydrogen atom, an acetyl group, or a benzoyl group is more preferable.

In a case where p represents 0, $R^{d2}$ represents an aryl group which may have a substituent, and $R^{d3}$ represents a hydrogen atom, the compound represented by the formula (D1) can be synthesized, for example, according to the following scheme 1. Specifically, an oxime compound represented by the following formula (1-4) can be obtained by acylating an aromatic compound represented by the following formula (1-1) through a Friedel-Crafts reaction using a halocarbonyl compound represented by the following formula (1-2) to obtain a ketone compound represented by the following formula (1-3), and oximating the obtained ketone compound (1-3) using hydroxylamine. Further, in the following formula (1-2), Hal means halogen, and $R^{d1}$ and $R^{d2}$ in the following formulae (1-1), (1-2), (1-3), and (1-4) are the same as those of the formula (D1).

Scheme 1

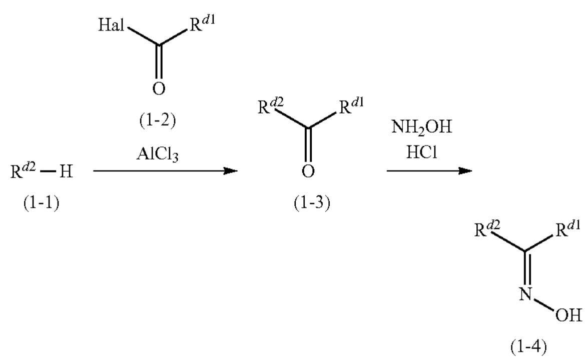

In a case where p represents 0, $R^{d2}$ represents an aryl group which may have a substituent, and $R^{d3}$ represents a group represented by —CO—$R^{d5}$, the compound represented by the formula (D1) can be synthesized, according to the following scheme 2. Specifically, an oxime ester compound represented by the following formula (1-7) can be obtained by reacting the oxime compound which is obtained using the method described in the scheme 1 and represented by the formula (1-4), and an acid anhydride ($(R^{d5}CO)_2O$) represented by the following formula (1-5) or an acid halide ($R^{d5}COHal$, Hal means halogen) represented by the following formula (1-6). Further, $R^{d1}$, $R^{d2}$, and $R^{d5}$ in the following formulae (1-4), (1-5), (1-6), and (1-7) are the same as those of the formula (1).

Scheme 2

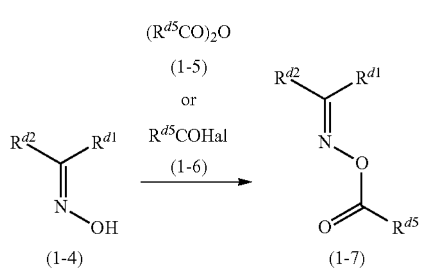

In a case where p represents 0, $R^{d2}$ represents an aliphatic hydrocarbon group having 1 to 10 carbon atoms, and $R^{d3}$ represents a hydrogen atom, the compound represented by the formula (D1) can be obtained as a compound represented by $R^{d2}$—C(═N—OH)—$R^{d1}$ by oximating a ketone compound represented by $R^{d2}$—CO—$R^{d1}$ using hydroxylamine according to the method described in the scheme 1.

In addition, in a case where p represents 0, $R^{d2}$ represents an aliphatic hydrocarbon group having 1 to 10 carbon atoms, and $R^{d3}$ represents a group represented by —CO—$R^{d5}$, the compound represented by the formula (D1) can be obtained as a compound represented by $R^{d2}$—C(═N—O—CO—$R^{d5}$)—$R^{d1}$ by acylating an oxime compound represented by $R^{d2}$—C(═N—OH)—$R^{d1}$ according to the method described in the scheme 2.

In a case where p represents 1 and $R^{d3}$ represents a hydrogen atom, the compound represented by the formula (D1) can be synthesized according to the following scheme 3. Specifically, a ketoxime compound represented by the following formula (2-3) can be obtained by reacting nitrite (RONO, R represents an alkyl group having 1 to 6 carbon atoms) represe1nted by the following formula (2-2) with a ketone compound represented by the following formula (2-1) in the presence of hydrochloric acid. Further, $R^{d1}$ and $R^{d2}$ in the following formulae (2-1) and (2-3) are the same as those of the formula (D1).

Scheme 3

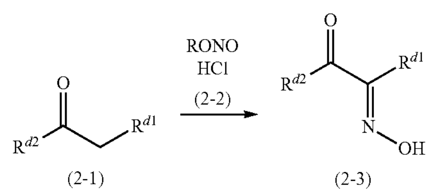

In a case where p represents 1 and $R^{d3}$ represents a group represented by —CO—$R^{d5}$, the compound represented by the formula (D1) can be synthesized according to the following scheme 4. Specifically, an oxime ester compound represented by the following formula (2-6) can be obtained by reacting an oxime compound of the formula (2-3) obtained using the method described in the scheme 3, and an acid anhydride ($(R^{d5}CO)_2O$) represented by the following formula (2-4) or an acid halide ($R^{d5}COHal$, Hal means halogen) represented by the following formula (2-5). In addition, $R^{d1}$, $R^{d2}$, and $R^{d5}$ in the following formulae (2-3), (2-4), (2-5), and (2-6) are the same as those of the formula (D1).

Scheme 4

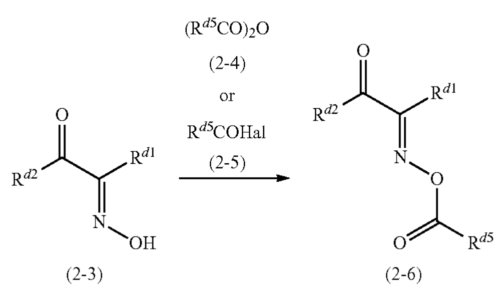

As a particularly preferable compound among the oxime ester compounds represented by the formula (D1), the following compounds represented by the following formulae can be exemplified.

D-1
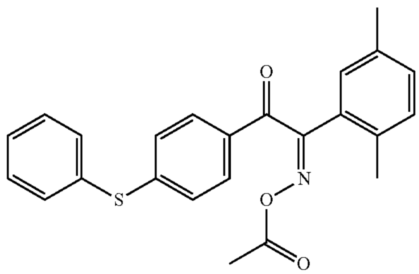
D-2
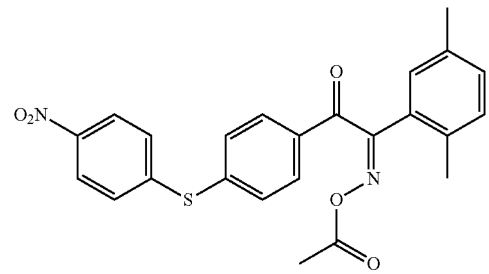
D-3
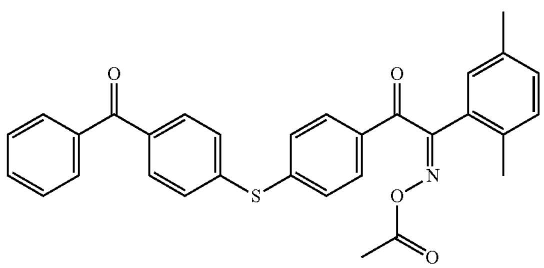
D-4
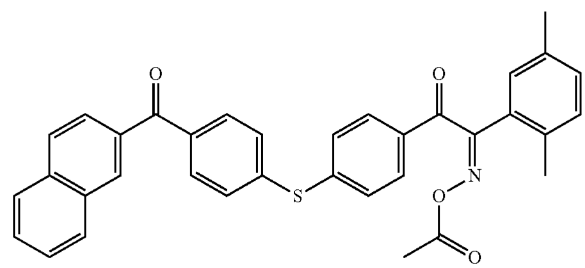
D-5
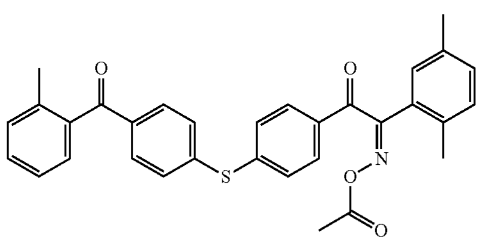
D-6
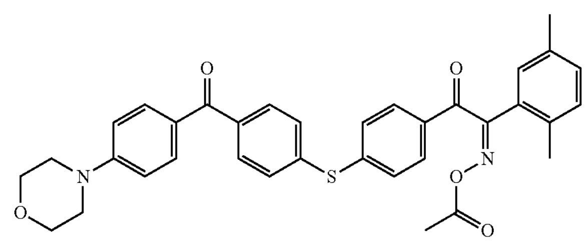
D-7
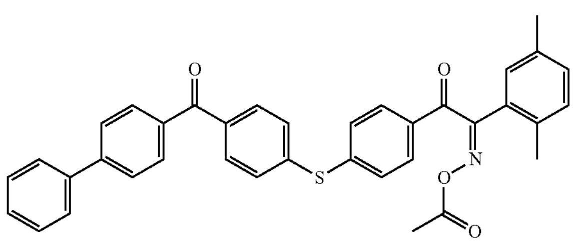
D-8
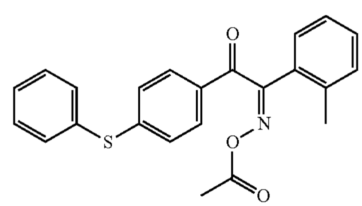
D-9
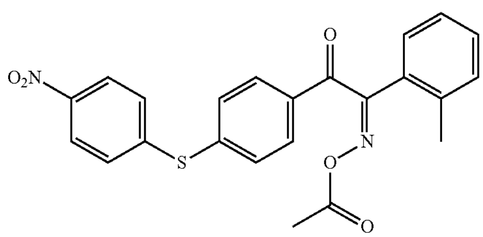
D-10
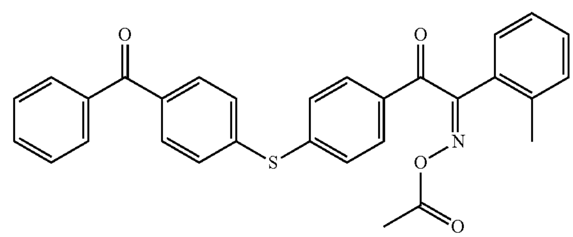
D-11
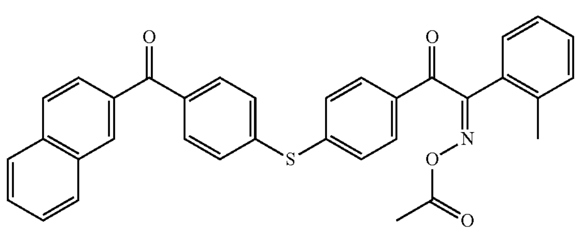
D-12
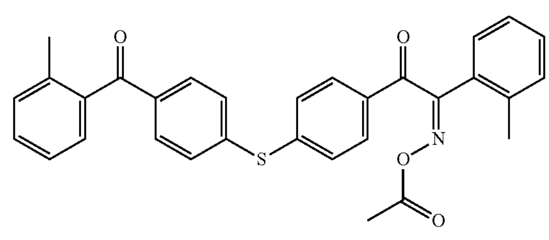

-continued
D-13
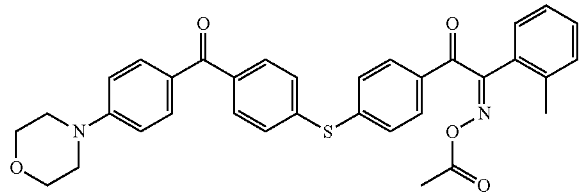
D-14
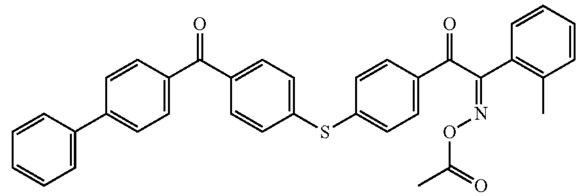
D-15
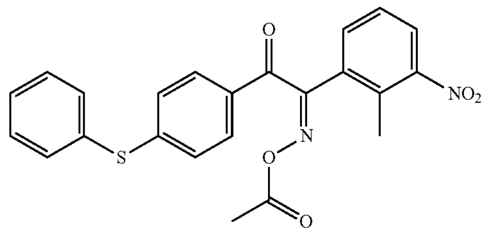
D-16
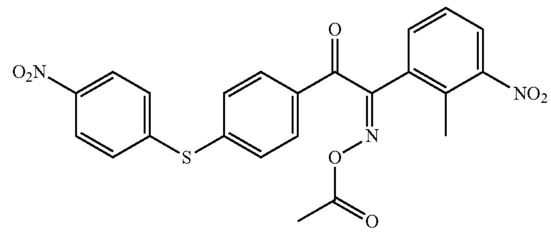
D-17
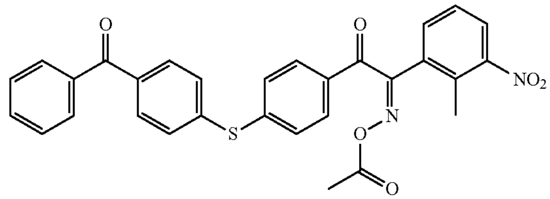
D-18
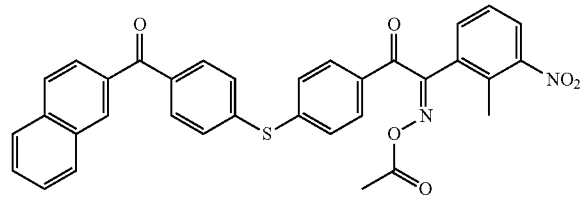
D-19
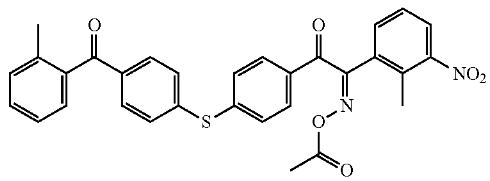
D-20
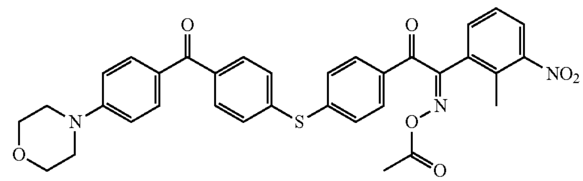
D-21
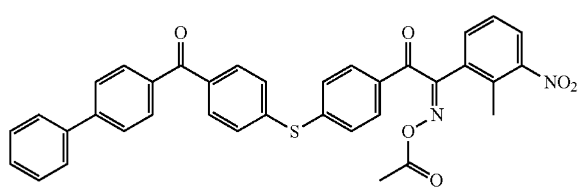
D-22
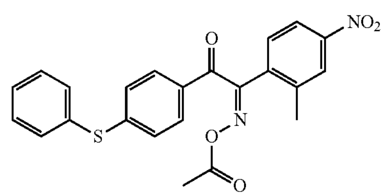
D-23
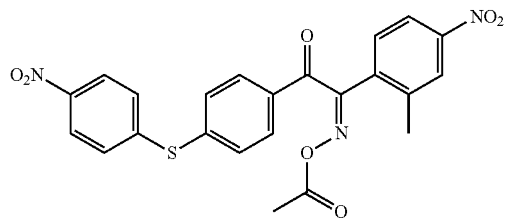
D-24
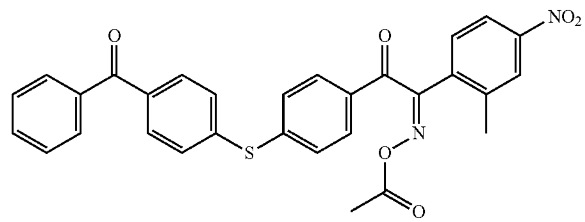
D-25
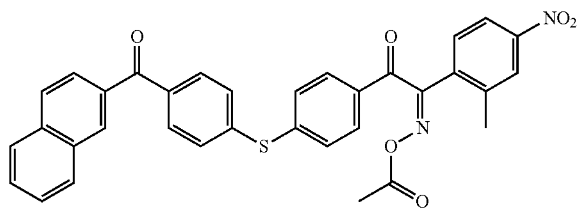
D-26
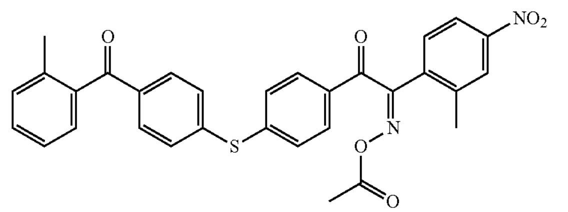

-continued
D-27
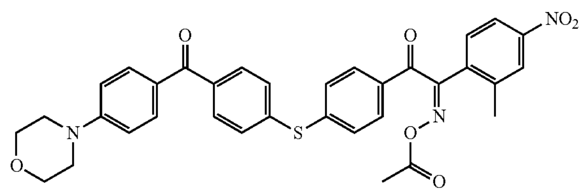
D-28
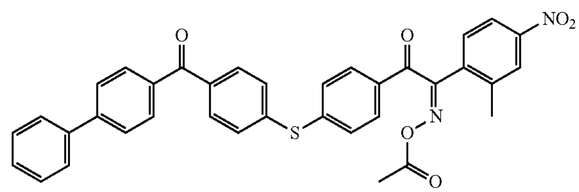
D-29
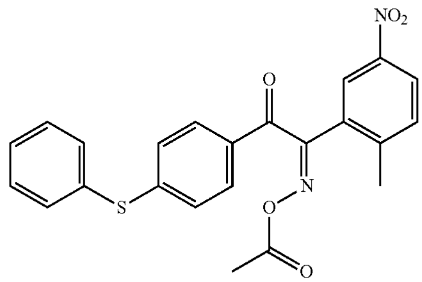
D-30
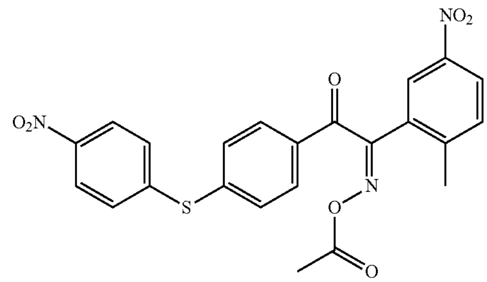
D-31
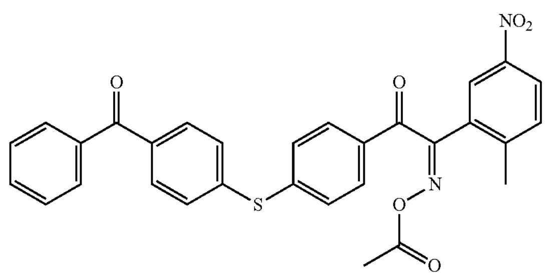
D-32
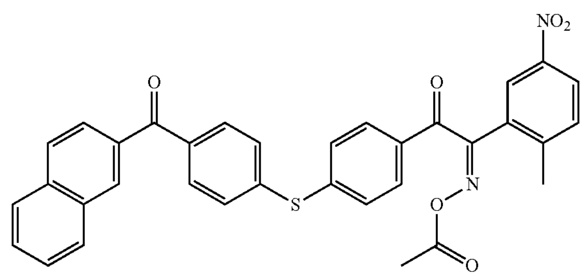
D-33
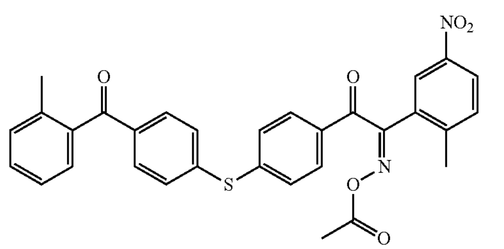
D-34
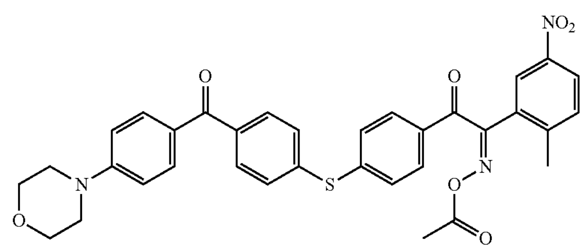
D-35
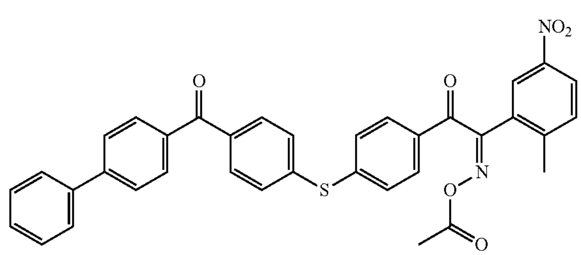
D-36
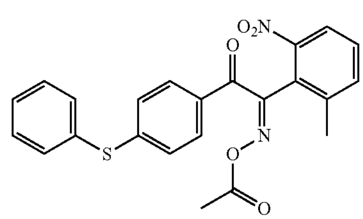
D-37
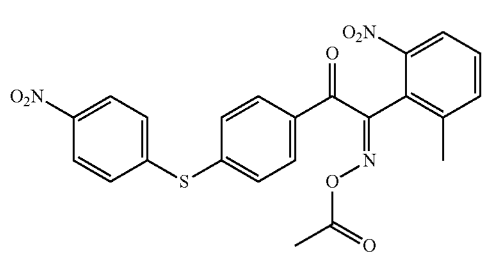
D-38
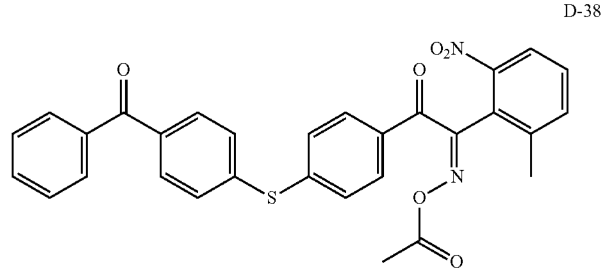

-continued
D-39
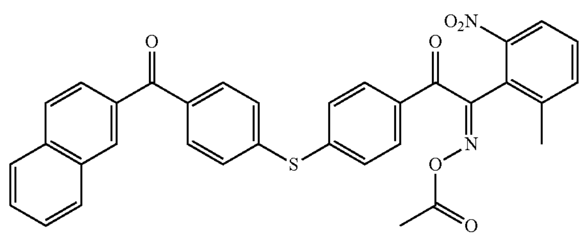
D-40
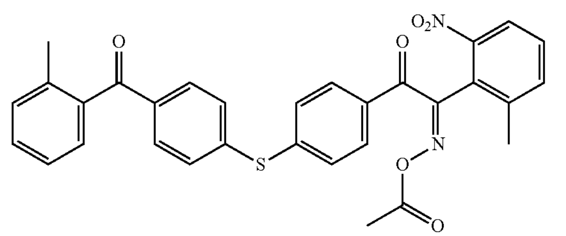
D-41
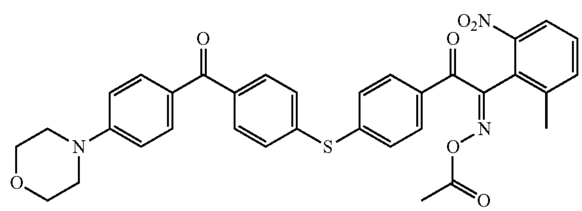
D-42
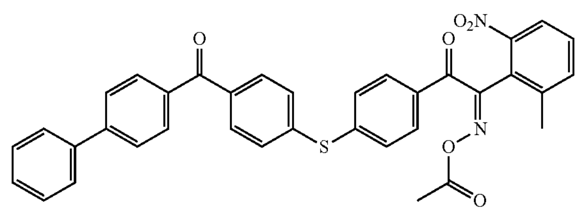
D-43
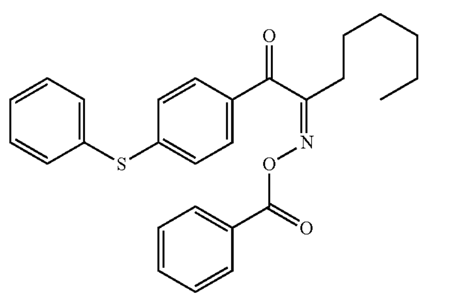
D-44
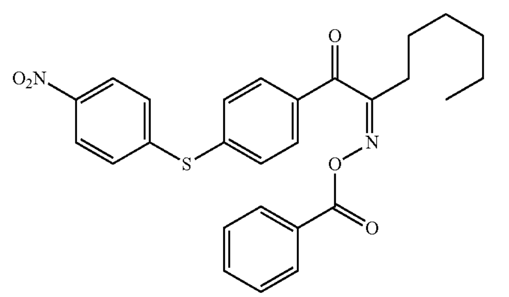
D-45
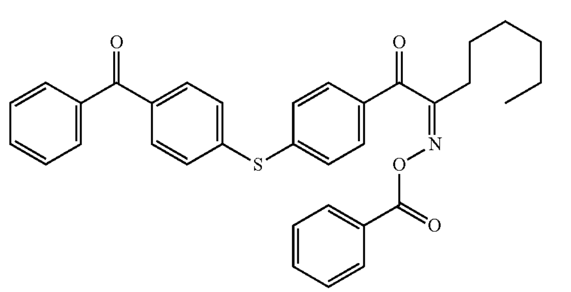
D-46
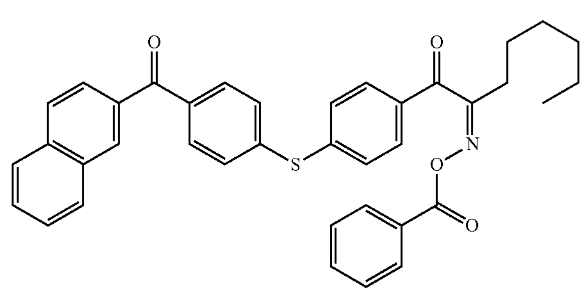
D-47
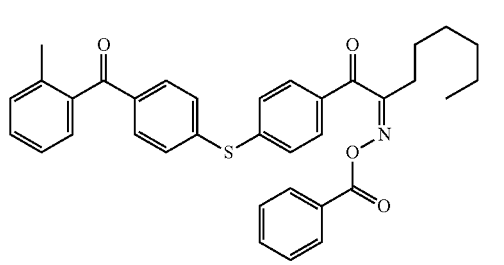
D-48
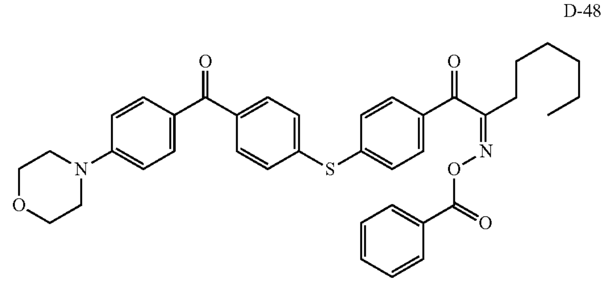
D-49
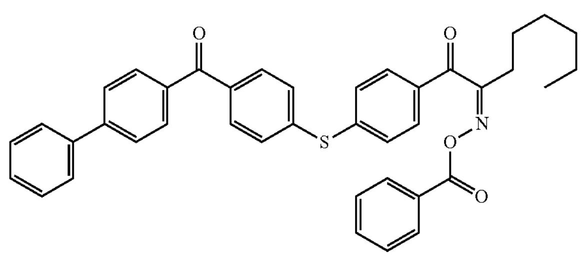
D-50
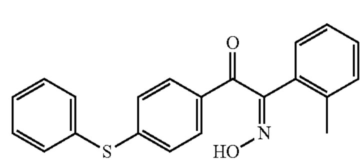

-continued
D-51
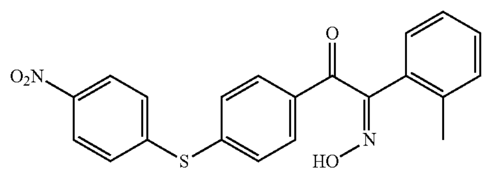
D-52
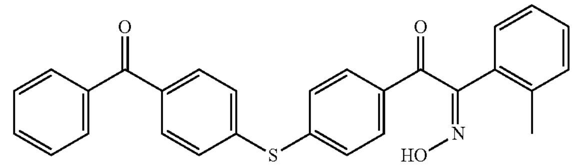
D-53
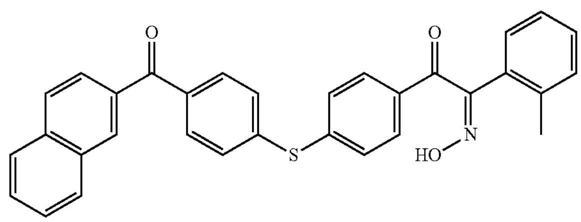
D-54
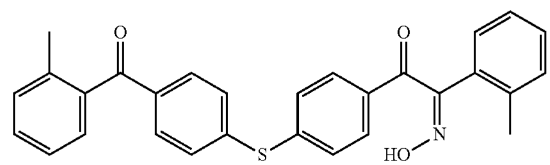
D-55
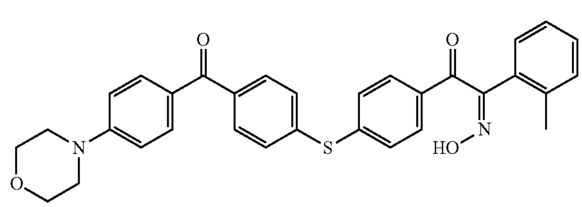
D-56
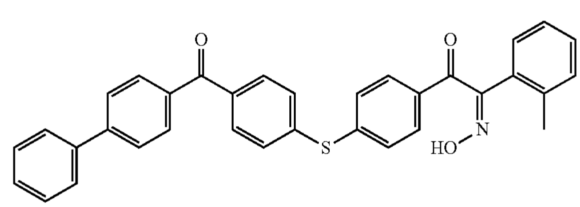
D-57
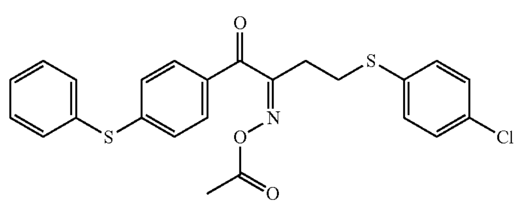
D-58
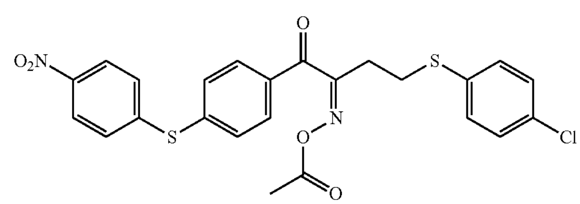
D-59
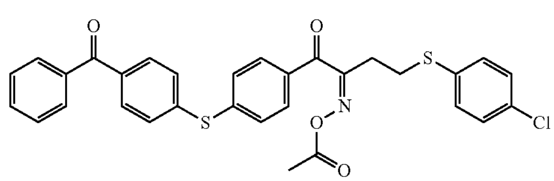
D-60
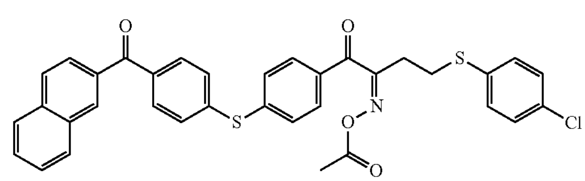
D-61
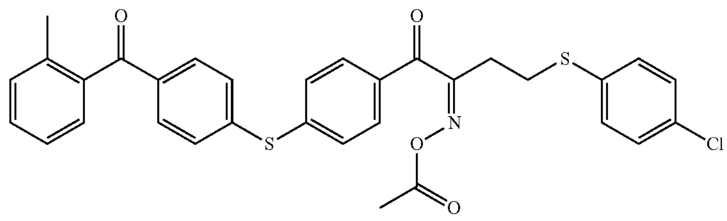
D-62
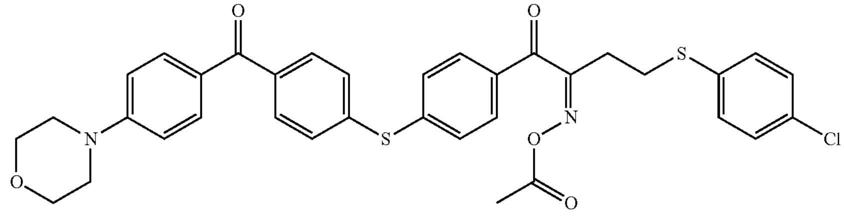

-continued

D-63

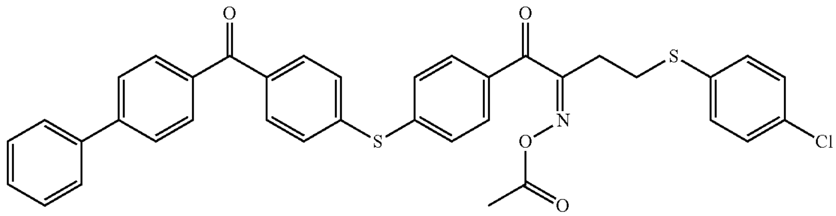

D-64

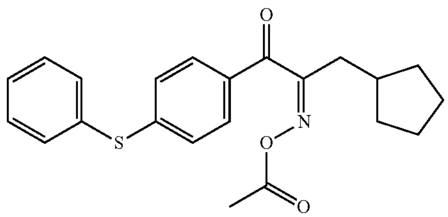

D-65

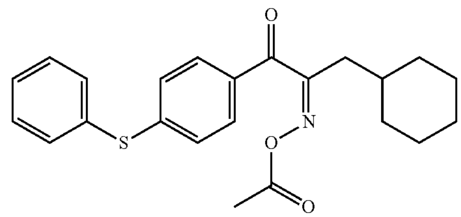

D-66

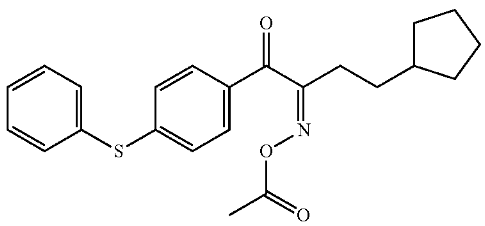

D-67

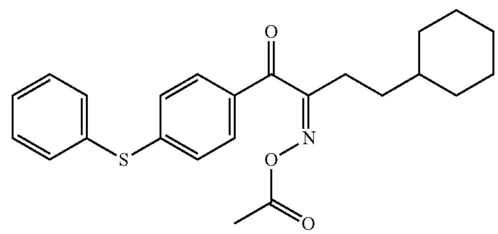

D-68

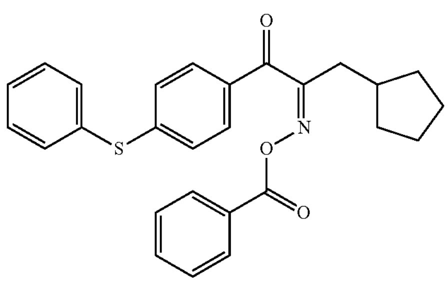

D-69

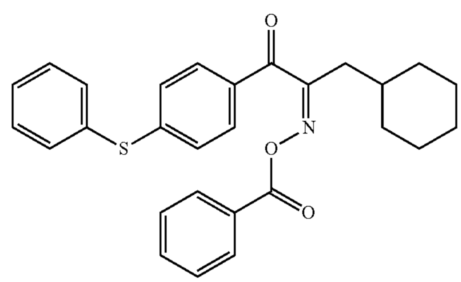

D-70

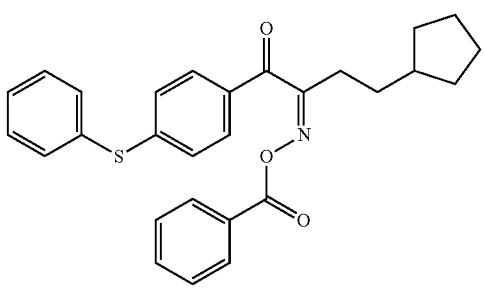

D-71

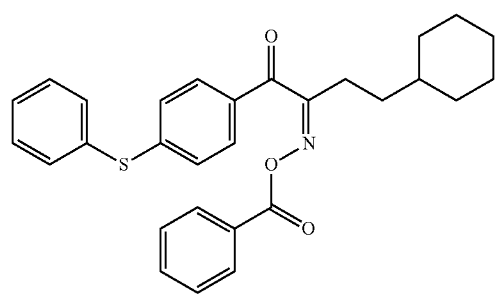

The content of the compound (D) represented by the formula (D1) in the curable composition is not particularly limited within a range that does not inhibit the purpose of the present invention. The content of the compound (D) represented by the formula (D1) in the curable composition is preferably in the range of 0.1% by mass to 10% by mass and more preferably in the range of 0.5% by mass to 4% by mass based on the total mass of the components other than the solvent (S) in the curable composition.

Solvent (S)

The curable composition may contain the solvent (S) in order to improve the coating properties thereof and to adjust the viscosity thereof.

Specific examples of the solvent (S) include (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate (PGMEA), and propylene glycol monoethyl ether acetate; other ethers such as diethylene glycol dimethyl ether, diethylene glycol methyl ethyl ether, diethylene glycol diethyl ether, and tetrahydrofuran; ketones such as acetone, methyl ethyl ketone, cyclohexanone, 2-heptanone, and 3-heptanone; alkyl lactates such as methyl 2-hydroxy propionate and ethyl 2-hydroxy propionate; other esters such as ethyl 2-hydroxy-2-methyl propionate, methyl 3-methoxy propionate, ethyl 3-methoxy propionate, methyl 3-ethoxy propionate, ethyl 3-ethoxy propionate, ethyl ethoxy acetate, ethyl hydroxy acetate, methyl 2-hydroxy-3-methyl butanoate, 3-methoxy butyl acetate, 3-methyl-3-methoxy butyl acetate, 3-methyl-3-methoxy butyl propionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; and amides such as N-methyl pyrrolidone, N,N-dimethyl formamide, and N,N-dimethylacetamide. Among these, alkylene glycol monoalkyl ethers, alkylene glycol monoalkyl ether acetates, the above-described other ethers, alkyl lactates, and the above-described other esters are preferable and alkylene glycol monoalkyl ether acetates, the above-described other ethers, and the above-described other esters are more preferable.

The content of the solvent (S) in the curable composition is not particularly limited. The content of the solvent (S) in the curable composition is suitably adjusted in consideration of handleability of the curable composition such as the coating properties thereof. The concentration of the components other than the solvent (S) in the curable composition is typically preferably 10% by mass or more, more preferably 15% by mass or more, and particularly preferably 20% by mass or more.

Other Components (E)

The curable composition can contain additives such as a surfactant, a thermal polymerization inhibitor, an anti-foaming agent, and a silane coupling agent if necessary. In addition, known additives in the related art can be used for all of these. Examples of the surfactant include an anionic compound, a cationic compound, and a non-ionic compound; examples of the thermal polymerization inhibitor include hydroquinone and hydroquinone monoethyl ether; and examples of the anti-foaming agent include a silicone-based compound and a fluorine-based compound.

Method of Producing Curable Composition

The curable composition can be produced by uniformly mixing respective components described above at a predetermined ratio. As a mixer which can be used for producing the curable composition, a two-roll or a three-roll can be exemplified. Since the curable composition containing respective components described above is cured at a low temperature of approximately 130° C. in a short period of time, it is preferable that the mixing operation at the time of preparing the curable composition is performed in a temperature range of room temperature to approximately 40° C. In a case where the viscosity of the curable composition is sufficiently low, in order to remove insoluble foreign matters, the curable composition may be filtered using a filter having an opening with a desired size if necessary.

The curable composition produced in this manner provides a cured material with excellent mechanical characteristics and the pot life is long even when cured at a low temperature in a short period of time. Further, such a curable composition is excellently adhered to various materials and thus can be preferably used for various applications similar to a curable composition in the related art which contains an epoxy compound.

Method of Curing Curable Composition

The temperature and the time for curing the above-described curable composition are not particularly limited as long as the curing is sufficiently promoted, the above-described curable composition can be cured at a low temperature in a short period of time. Specifically, the curable composition is cured in a temperature range of, approximately, 130° C. to 140° C. for approximately 3 minutes to 10 minutes. In addition, the above-described curable composition can be cured at a low temperature, but the curable composition can be cured at a high temperature. The curing temperature of the curable composition is not particularly limited as long as thermal decomposition of the components contained in the curable composition or volatilization or sublimation of the components other than the solvent (S) does not occur at the temperature.

Adhesive

The above-described curable composition can be favorably used as an adhesive for adhering various materials because an epoxy compound which is blended with various adhesives in the related art or a vinyl ether compound is contained therein as the polymerizable compound (A). The method of using the adhesive is the same as that of the adhesive containing an epoxy compound in the related art. As a specific adhering method, a method of coating a predetermined area of at least one of plural adherends with an adhesive or injecting the adhesive thereto, fixing the plural adherends in a desired state, and then heating the plural adherends can be exemplified.

In addition, as described above, the cured material of the curable composition excellently adheres to various materials. For this reason, the curable composition described above can be used as a material for sealing electronic components such as various semiconductor elements.

Fiber-Reinforced Composite Material

The above-described curable composition can be preferably used as a material to form a matrix in a fiber-reinforced composite material formed of a matrix and reinforced fibers.

The reinforced fibers are not particularly limited as long as the fibers are used for producing a fiber-reinforced composite material in the related art. Any of a twisted yarn, an untwisting yarn, and a non-twisted yarn can be used for the reinforced fibers and an untwisting yarn or a non-twisting yarn is preferable in terms of formability and mechanical strength of the fiber-reinforced composite material.

The form of reinforced fibers is not particularly limited. Short fibers of the reinforced fibers may be dispersed in a matrix or long fibers of the reinforced fibers aligned in one direction or woven fabric or nonwoven fabric of the reinforced fibers may be coated with a matrix. In a case where the reinforced fibers are woven fabric, the weaving method can be freely selected from plain weave and satin weave according to the region to be used or the use thereof.

From a viewpoint of mechanical strength or durability of the fiber-reinforced composite material, examples of the reinforced fibers include carbon-based fibers, glass fibers, aramid fibers, boron fibers, alumina fibers, and silicon carbide fibers. The reinforced fibers may be used in combination of two or more kinds thereof. Among these reinforced fibers, carbon fibers are preferable in terms of particularly excellent strength of the fiber-reinforced composite material. As the carbon fibers, polyacrylonitrile-based carbon fibers, pitch-based carbon fibers, or rayon-based carbon fibers can be used. Among these carbon fibers, polyacrylonitrile-based carbon fibers are preferable.

The volume content of the reinforced fibers in the fiber-reinforced composite material formed of a matrix and reinforced fibers, which can be suitably selected according to the strength or the shape of the fiber-reinforced composite material, is typically preferably in the range of 40% by volume to 85% by volume and more preferably in the range of 50% by volume to 70% by volume.

The method of producing the fiber-reinforced composite material is not particularly limited. The fiber-reinforced composite material is produced by impregnating the curable composition into the reinforced fibers and curing the curable composition under a predetermined condition according to the known method. Since the above-described curable composition is cured at a low temperature in a short period of time, when the curable composition is used, the fiber-reinforced composite material can be produced at a high cycle while the energy required for curing is reduced.

EXAMPLES

Hereinafter, the present invention will be described in more detail with reference to Examples. Further, the present invention is not limited to the range of Examples.

Examples 1 to 21 and Comparative Examples 1 to 12

In Examples 1 to 14 and Comparative Examples 1 to 9, the following EP1 to EP3, EP4 (a 1,2-epoxy-4-(2-oxiranyl) cyclohexane adduct of 2,2-bis(hydroxymethyl)-1-butanol, EHPE-3-150, manufactured by Daicel Corporation), and EP5 which are epoxy compounds (A1) were used as the components (A). In addition, in Examples 15 to 21 and Comparative Examples 10 to 12, the following DV1 and DV2 which are vinyl ether compounds (A2) were used as the components (A).

EP1

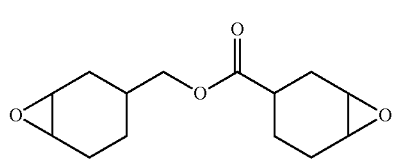

EP2

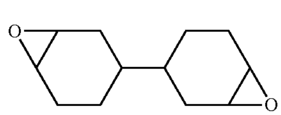

-continued

EP3

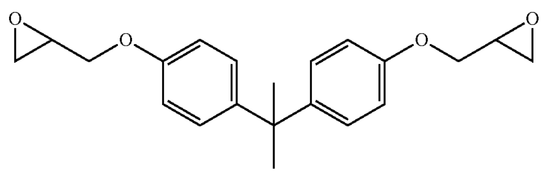

EP5

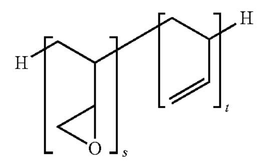

s: 8-11, t: 35-43

DV1

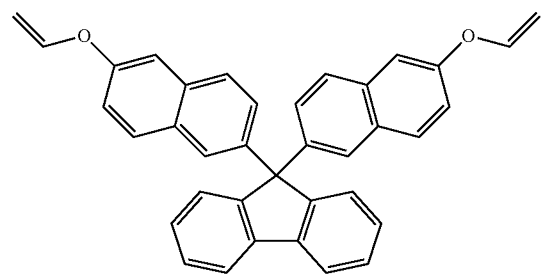

DV2

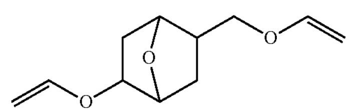

In Examples and Comparative Examples, the following R1 to R4, R5 (methacrylic acid), and R6 (acetic acid) which are reactive compounds (B) and the following R7 which is a component similar to the reactive compound (B) were used as the components (B). In regard to R4, the numerical values on the lower right sides of the parentheses which represent respective units indicate the contents (% by mass) of respective units in the polymer.

R1

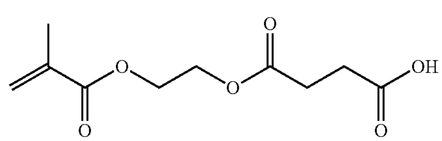

R2

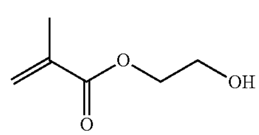

R3

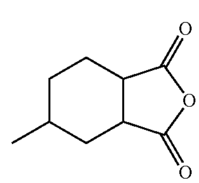

-continued

R4

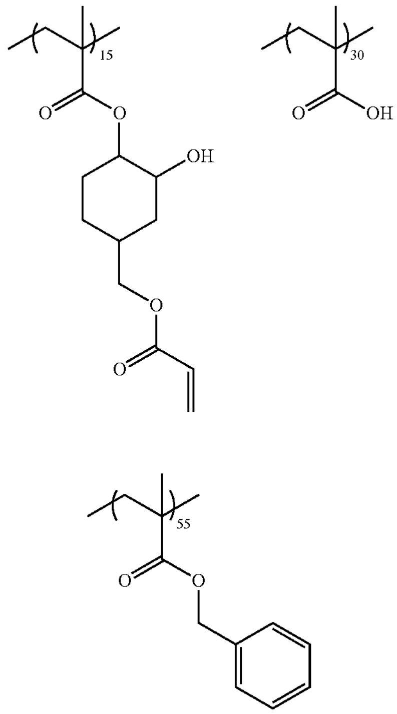

R7

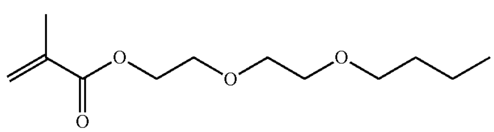

In Examples and Comparative Examples, the following IG1 and IG2 which are the compounds (C) represented by the formula (C1), and IG3 (1-methyl imidazole) which is a component similar to the compound (C) represented by the formula (C1) were used as the components (C).

IG1

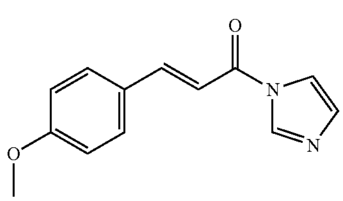

IG2

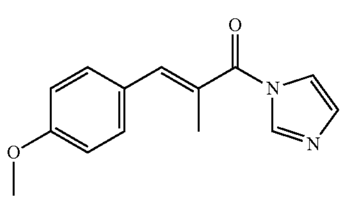

In Examples and Comparative Examples, the following CA1 to CA3 which are the compounds (D) represented by the formula (D1) and CA4 to CA6 which are components similar to the compounds (D) represented by the formula (D1) were used as the components (D).

CA1

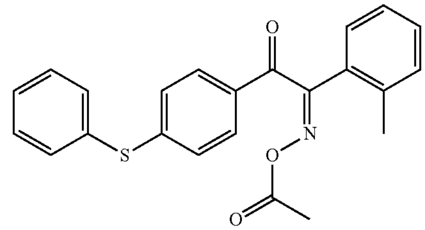

CA2

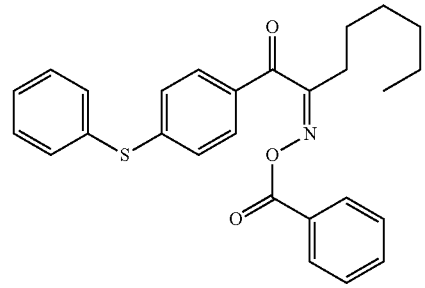

CA3

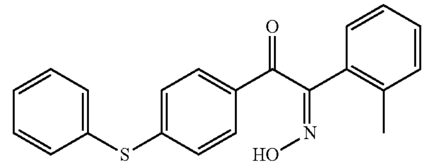

CA4

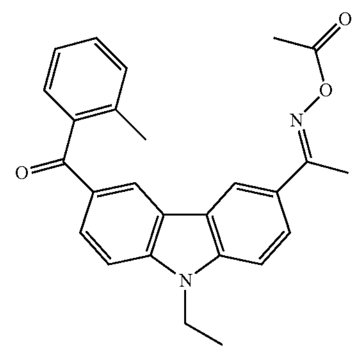

CA5

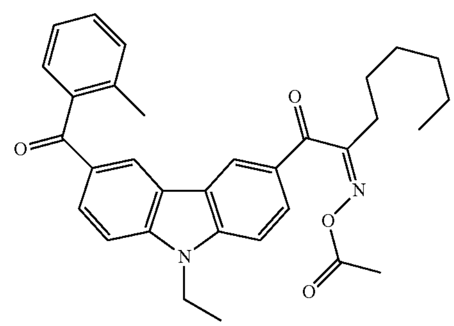

CA6

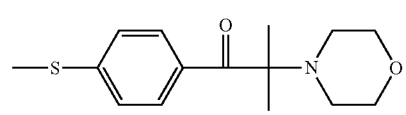

Curable compositions of Examples and Comparative Examples were obtained by uniformly mixing the components (A), the components (B), the components (C), and the components (D) whose kinds and amounts are listed in Table 1 using a three-roll. In addition, in Examples 4 and 9, a mixture of the components (A) to (D) was diluted with a solvent (S1: propylene glycol monomethyl ether acetate) which is the component (S) whose amount is listed in Table 1.

In regard to the curable compositions obtained in Examples 1 to 13 and Comparative Examples 1 to 9, evaluation of bending strength of the cured materials was performed according to the following method. In regard to the curable compositions obtained in Examples 14 to 21 and Comparative Examples 10 to 12, evaluation of solvent resistance of the cured materials was performed according to the following method. In regard to the curable compositions obtained in all Examples and Comparative Examples, evaluation of bottle stability was performed according to the following method. These evaluation results are listed in Tables 1 and 2.

Evaluation of Bending Strength of Cured Materials

A curable composition was injected into a gap with a width of 2 mm which was formed between two sheets of glass plates. The curable composition injected into the gap was heated under the conditions of at 130° C. for 3 minutes or at 170° C. for 10 minutes and a cured material was formed. The glass plates were allowed to be peeled off from the cured material, thereby obtaining a test piece of the cured material in a shape of a plate having a thickness of 2 mm. In a case where the surface of the test piece was not in a tack-free state which means the surface of the test piece is not sticky, it was determined that the test piece was uncured and measurement of the bending strength of the test piece was not performed. The bending strength (MPa) of the test piece was measured using the test piece of the obtained cured material in conformity with JIS K6911. The measurement results of the bending strength are listed in Table 1.

Evaluation of Solvent Resistance of Cured Material

A coating film (cured material) having a film thickness of 20 μm was formed by coating a glass substrate with the curable composition using a spin coater and performing heating under the conditions of at 130° C. for 3 minutes or 170° C. for 10 minutes. Further, propylene glycol monomethyl ether acetate and cyclohexanone were added dropwise onto the formed coating film at room temperature. Next, the state in which the coating film was in contact with propylene glycol monomethyl ether acetate and cyclohexanone was maintained for 5 minutes. After the solvents were brought into contact with the coating film, the solvent resistance of the coating film was evaluated according to the following criteria.

A: The coating film remained in both solvents.

C: The coating film was dissolved in at least one solvent and did not remain on the glass substrate.

Evaluation of Bottle Stability

The viscosity (cP) immediately after the curable composition was prepared was measured using an E type viscometer (TV-20 type, cone-plate type, manufactured by Toki Sangyo Co., Ltd.). Further, the viscosity of the curable composition was measured after the curable composition was stored at 25° C. for 3 days and after the curable composition was stored for 7 days. A case where the viscosity after the storage for 3 days was increased from the initial viscosity by 20 cP or higher was determined as C. A case where the increased amount of the viscosity after the storage for 3 days from the initial viscosity was less than 20 cP and the increased amount of the viscosity after the storage for 7 days from the initial viscosity was 20 cP or higher was determined as B. A case where the increased amount of the viscosity after the storage for 7 days from the initial viscosity was less than 20 cP was determined as A.

TABLE 1

| | Kinds and contents of respective components (kind/parts by mass) | | | | | Bending strength of cured material (MPa) | | |
|---|---|---|---|---|---|---|---|---|
| | (A) | (B) | (C) | (D) | (S) | Curing at 130° C. for 3 minutes | Curing at 170° C. for 10 minutes | Bottle stability |
| Ex. 1 | EP1/50 | R1/50 | IG1/1.5 | CA1/2 | — | 169 | 170 | A |
| Ex. 2 | EP2/50 | R1/50 | IG1/1.5 | CA1/2 | — | 164 | 165 | A |
| Ex. 3 | EP4/50 | R1/50 | IG1/1.5 | CA1/2 | — | 139 | 140 | A |
| Ex. 4 | EP1/50 | R1/50 | IG1/1.5 | CA1/2 | S1/100 | 169 | 170 | A |
| Ex. 5 | EP1/50 | R2/50 | IG1/1.5 | CA1/2 | — | 155 | 165 | A |
| Ex. 6 | EP1/50 | R3/50 | IG1/1.5 | CA1/2 | — | 169 | 170 | A |
| Ex. 7 | EP1/50 | R1/50 | IG2/1.5 | CA1/2 | — | 140 | 170 | A |
| Ex. 8 | EP4/50 | R1/50 | IG1/1.5 | CA1/2 | — | 155 | 155 | A |
| Ex. 9 | EP1/50 | R4/100 | IG1/1.5 | CA1/2 | S1/50 | 150 | 150 | A |
| Ex. 10 | EP1/50 | R5/50 | IG1/1.5 | CA1/2 | — | 169 | 170 | B |
| Ex. 11 | EP5/50 | R1/50 | IG1/1.5 | CA1/2 | — | 175 | 175 | B |
| Ex. 12 | EP1/50 | R1/50 | IG1/1.5 | CA2/2 | — | 169 | 170 | A |
| Ex. 13 | EP1/50 | R1/50 | IG1/1.5 | CA3/2 | — | 169 | 170 | A |
| Comp. Ex. 1 | EP1/50 | R1/50 | IG1/1.5 | — | — | Not cured | 170 | A |
| Comp. Ex. 2 | EP1/50 | R1/50 | — | CA1/2 | — | Not cured | 170 | A |

TABLE 1-continued

| | Kinds and contents of respective components (kind/parts by mass) | | | | | Bending strength of cured material (MPa) | | |
|---|---|---|---|---|---|---|---|---|
| | (A) | (B) | (C) | (D) | (S) | Curing at 130° C. for 3 minutes | Curing at 170° C. for 10 minutes | Bottle stability |
| Comp. Ex. 3 | EP1/ 50 | — | IG1/ 1.5 | CA1/ 2 | — | Not cured | 170 | A |
| Comp. Ex. 4 | — | R1/ 50 | IG1/ 1.5 | CA1/ 2 | — | Not cured | Not cured | A |
| Comp. Ex. 5 | EP1/ 50 | R7/ 50 | IG1/ 1.5 | CA1/ 2 | — | 110 | 120 | A |
| Comp. Ex. 6 | EP1/ 50 | R1/ 50 | IG3/ 1.5 | CA1/ 2 | — | 150 | 170 | C |
| Comp. Ex. 7 | EP1/ 50 | R1/ 50 | IG1/ 1.5 | CA4/ 2 | — | Not cured | 170 | A |
| Comp. Ex. 8 | EP1/ 50 | R1/ 50 | IG1/ 1.5 | CA5/ 2 | — | Not cured | 170 | A |
| Comp. Ex. 9 | EP1/ 50 | R1/ 50 | IG1/ 1.5 | CA6/ 2 | — | Not cured | 170 | A |

TABLE 2

| | Kinds and contents of respective components (kind/parts by mass) | | | | | Solvent resistance | | |
|---|---|---|---|---|---|---|---|---|
| | (A) | (B) | (C) | (D) | (S) | Curing at 130° C. for 3 minutes | Curing at 170° C. for 10 minutes | Bottle stability |
| Ex. 14 | EP1/ 50 | R6/ 50 | IG1/ 1.5 | CA2/ 2 | — | A | A | A |
| Ex. 15 | DV1/ 50 | R1/ 50 | IG1/ 1.5 | CA2/ 2 | — | A | A | A |
| Ex. 16 | DV1/ 50 | R1/ 50 | IG1/ 1.5 | CA1/ 2 | — | A | A | A |
| Ex. 17 | DV2/ 50 | R1/ 50 | IG1/ 1.5 | CA2/ 2 | — | A | A | A |
| Ex. 18 | DV1/ 50 | R1/ 50 | IG1/ 1.5 | CA3/ 2 | — | A | A | A |
| Ex. 19 | DV2/ 50 | R1/ 50 | IG1/ 1.5 | CA3/ 2 | — | A | A | A |
| Ex. 20 | DV1/ 50 | R3/ 50 | IG1/ 1.5 | CA2/ 2 | — | A | A | A |
| Ex. 21 | DV2/ 50 | R3/ 50 | IG1/ 1.5 | CA2/ 2 | — | A | A | A |
| Comp. Ex. 10 | DV1/ 50 | R1/ 50 | IG1/ 1.5 | — | — | C | A | A |
| Comp. Ex. 11 | DV1/ 50 | R1/ 50 | — | CA1/ 2 | — | C | C | A |
| Comp. Ex. 12 | DV1/ 50 | — | IG1/ 1.5 | CA1/ 2 | — | C | C | A |

From Examples 1 to 13, it is understood that the curable compositions containing the components (A), the components (B), the components (C), and the components (D) which are respectively predetermined structures can form a cured material with excellent bending strength by being cured at a low temperature in a short period of time and have a long pot life. In addition, according to Examples 14 to 21, it is understood that the curable compositions containing the components (A), the components (B), the components (C), and the components (D) which are respectively predetermined structures can form a cured material, which is almost completely cured to the extent of not being dissolved in a solvent, by being cured at a low temperature in a short period of time and have a long pot life.

From Comparative Examples 1 to 4 and 10 to 12, it is understood that the curable compositions cannot be sufficiently cured and cannot form a cured material with excellent bending strength under the condition of curing at a low temperature in a short period of time when the curable compositions do not contain any of the components (A), the components (B), the components (C), and the components (D).

From Comparative Example 5, it is understood that a cured material with excellent bending strength cannot be obtained under the condition of curing at a low temperature or a high temperature if the curing is performed in a short period of time of 10 minutes or shorter when a curable composition which contains a compound having predetermined structures as the component (A), the component (C), and the component (D), has a (meth)acryloyl group as the component (B), and does not contain a hydroxyl group or a carboxyl group is used.

From Comparative Example 6, it is understood that a cured material with excellent bending strength can be obtained under the condition of curing at a low temperature in a short period of time but the pot life of the curable composition is exceedingly short when a curable composition which contains a compound having predetermined structures as the component (A), the component (B), and the component (D) and contains not a compound represented by the formula (C1) but 1-methylimidazole as the component (C) is used.

From Comparative Examples 7 to 9, it is understood that a cured material with excellent bending strength cannot be obtained under the condition of curing at a low temperature in a short period of time when curable compositions which contain compounds having predetermined structures as the components (A), the components (B), and the components (C) and contain compounds other than compounds having a structure represented by the formula (D1) as the component (D) is used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A curable composition, comprising:

a polymerizable compound (A) which is one or more compounds selected from the group consisting of an epoxy compound (A1) and a vinyl ether compound (A2);

a reactive compound (B) which is one or more compounds selected from the group consisting of a compound (B 1) having one or more functional groups selected from a hydroxyl group and a carboxyl group and a polyvalent carboxylic anhydride (B2);

a compound (C) represented by the following formula (C1); and a compound (D) represented by the following formula (D1), (C1)

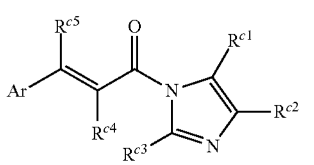

wherein in the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent, (D1)

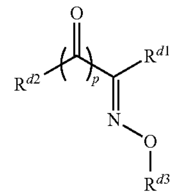

wherein in the formula (D1), $R^{d1}$ represents an aliphatic hydrocarbon group having 1 to 10 carbon atoms which may have a substituent or an aryl group which may have a substituent; $R^{d2}$ represents an aliphatic hydrocarbon group having 1 to 10 carbon atoms or an aryl group which may have a substituent; $R^{d3}$ represents a hydrogen atom or a group represented by —CO—$R_{d5}$; $R^{d5}$ represents an alkyl group having 1 to 6 carbon atoms or an aryl group which may have a substituent; and p represents 0 or 1.

2. The curable composition according to claim 1, wherein the reactive compound (B) contains the compound (B 1) having one or more functional groups selected from a hydroxyl group and a carboxyl group, and the compound (B1) having one or more functional groups selected from a hydroxyl group and a carboxyl group further contains a (meth)acryloyl group.

3. The curable composition according to claim 2, wherein the epoxy compound (A) is an aliphatic epoxy compound.

4. The curable composition according to claim 1, wherein the epoxy compound (A) is an aliphatic epoxy compound.

5. An adhesive which is formed from the curable composition according to claim 1.

6. A method of producing a fiber-reinforced composite material, comprising curing the curable composition according to claim 1, which is impregnated into reinforced fibers, by heating.

7. A fiber-reinforced composite material comprising:

a matrix formed of a cured material of the curable composition according to claim 1; and reinforced fibers.

8. A curable composition comprising:

a polymerizable compound (A) which is one or more compounds selected from the group consisting of an epoxy compound (A1) and a vinyl ether compound (A2);

a reactive compound (B) which is one or more compounds selected from the group consisting of a compound (B1) having one or more functional groups selected from a hydroxyl group and a carboxyl group and a polyvalent carboxylic anhydride (B2);

a compound (C) represented by the following formula (C1); and a compound (D) represented by the following formula (D1), wherein the compound (B 1) having one or more functional groups selected from a hydroxyl group and a carboxyl group is a compound selected from the group consisting of a compound represented by the following formula (B1-1), a compound represented by the following formula (B1-2) and a compound represented by the following formula (B1-3);

wherein the polyvalent carboxylic anhydride (B2) is a compound selected from the group consisting of tetrahydrophthalic anhydride, hexahydrophthalic anhydride, methyl hexahydrophthalic anhydride, hexahydrotrimellitic anhydride, phthalic anhydride, trimellitic anhydride, and a styrene-maleic anhydride copolymer;

(C1)

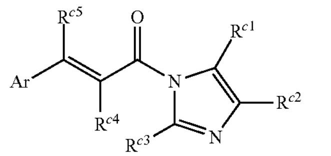

wherein in the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent;

(D1)

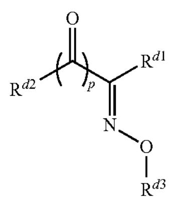

wherein in the formula (D1), $R^{d1}$ represents an aliphatic hydrocarbon group having 1 to 10 carbon atoms which may have a substituent or a phenyl group which may have a substituent; $R^{d2}$ represents a phenyl group which may have a substituent; $R^{d5}$ represents an alkyl group having 1 to 6 carbon atoms or an aryl group which may have a substituent; and p represents 0 or 1, (B1-1)

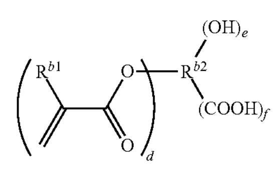

wherein in the formula (B1-1), $R^{b1}$ represents a hydrogen atom or a methyl group; $R^{b2}$ represents a (d+e+f) valent aromatic group; d represents an integer of 1 to 3; e and f each represent an integer of 0 to 3; and (e+f) represents an integer of 1 or higher, and (B1-2)

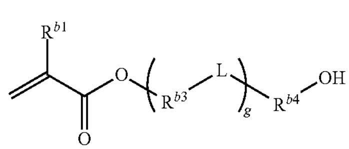

-continued (B1-3)

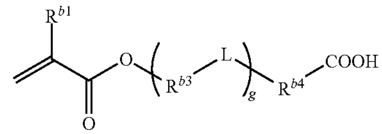

wherein in the formulae (B1-2) and (B1-3), $R^{b1}$ represents a hydrogen atom or a methyl group; $R^{b3}$ and $R^{b4}$ represent an alkylene group having 1 to 20 carbon atoms; L represents —O—, —CO—O—, or —O—CO—; in the formula (B1-2), g represents an integer of 1 to 5; and in the formula (B1-3), g represents an integer of 1 to 5.

9. The curable composition according to claim 8, wherein the epoxy compound (A) is an aliphatic epoxy compound.

10. An adhesive which is formed of the curable composition according to claim 8.

11. A method of producing a fiber-reinforced composite material, comprising curing the curable composition according to claim 8, which is impregnated into reinforced fibers, by heating.

12. A fiber-reinforced composite material comprising a matrix formed of a cured material of the curable composition according to claim 8; and reinforced fibers.

13. A curable composition comprising:

a polymerizable compound (A) which is one or more compounds selected from the group consisting of an epoxy compound (A1) and a vinyl ether compound (A2);

a reactive compound (B) which is one or more compounds selected from the group consisting of a compound (B1) having one or more functional groups selected from a hydroxyl group and a carboxyl group and a polyvalent carboxylic anhydride (B2);

a compound (C) represented by the following formula (C1); and a compound (D) represented by the following formula (D1), wherein the epoxy compound (A1) is a compound selected from the group consisting of 2-(3,4-epoxycyclohexyl-5,5-spiro-3,4-epoxy)cyclohexane-meth-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ϵ-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylenebis(3,4-epoxycyclohexanecarboxylate), dioctyl epoxycyclohexahydro phthalate, di-2-ethylhexyl epoxycyclohexahydro phthalate, a compound represented by the following formula (A-1); 2-methylglycidyl (meth)acrylate, 3,4-epoxybutyl(meth)acrylate, 6,7-epoxyheptyl(meth)acrylate, 2-glycidyloxyethyl(meth) acrylate, 3-glycidyloxy-n-propyl(meth)acrylate, 4-glycidyloxy-n-butyl(meth)acrylate, 5-glycidyloxy-n-hexyl(meth)acrylate, 6-glycidyloxy-n-hexyl(meth)acrylate, a bisphenol A epoxy resin, a bisphenol F epoxy resin, a bisphenol S epoxy resin, a bisphenol AD epoxy resin, a naphthalene epoxy resin, a biphenyl epoxy resin, a phenol novolac epoxy resin, a brominated phenol novolac epoxy resin, an ortho-cresol novolac epoxy resin, a bisphenol A novolac epoxy resin, a bisphenol AD novolac epoxy resin, an epoxide of a dicyclopentadiene phenol resin, an epoxide of a naphthalene phenol resin, dimer acid glycidyl ester, tetraglycidylamino diphenyl methane, triglycidyl-p-aminophenol, tetraglycidyl metaxylylene diamine, tetraglycidyl bisaminomethyl cyclohexane, triglycidyl isocyanurate, phloroglucinol triglycidyl ether, trihydroxy biphenyl triglycidyl ether, trihydroxy phenyl methane triglycidyl ether, glycerin triglycidyl ether, 2-[4-(2,3-epoxypropoxy)phenyl]-2-[4-[1,1-bis[4-(2,3-epoxypropoxy)phenyl]ethyl]phenyl] propane, 1,3-bis[4-[1-[4-(2,3-epoxypropoxy)phenyl]-1-[4-[1-[4-(2,3-epoxypropoxy)phenyl]-1-methylethyl]phenyl] ethyl]phenoxy]-2-propanol, tetrahydroxy phenyl ethane tetraglycidyl ether, tetraglycidyl benzophenone, bisresorcinol tetraglycidyl ether, tetraglycidoxy biphenyl, a 1,2-epoxy-4-(2-oxiranyl)cyclohexane adduct of 2,2-bis(hydroxymethyl)-1-butanol, and a polymer having an unsaturated aliphatic hydrocarbon group in a side chain thereof and an epoxy group formed by oxidation of an unsaturated bond contained in the side chain, (A-1)

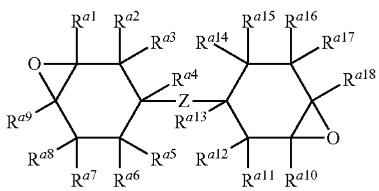

wherein in the formula (A-1), Z represents a single bond, a divalent group selected from the group consisting of —O—, —O—CO—, —S—, —SO—, —$SO_2$—, —$CH_2$—, —$C(CH_3)_2$—, $CBr_2$—, —$C(CBr_3)_2$—,—$C(CF_3)_2$—, and —$R^{a19}$—O—CO—; $R^{a19}$ represents an alkylene group having 1 to 8 carbon atoms; and $R^{a1}$ to $R^{a18}$ each independently represent a group selected from the group consisting of a hydrogen atom, a halogen atom, and an organic group, (C1)

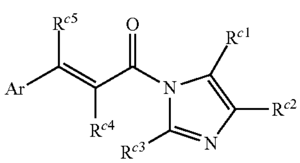

wherein in the formula (C1), $R^{c1}$, $R^{c2}$, and $R^{c3}$ each independently represent a hydrogen atom, a halogen atom, a hydroxyl group, a mercapto group, a sulfide group, a silyl group, a silanol group, a nitro group, a nitroso group, a sulfonate group, a phosphino group, a phosphinyl group, a phosphonate group, or an organic group; $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonate group, a phosphino group, a phosphinyl group, a phosphono group, a phosphonate group, or an organic group; and Ar represents an aromatic group which may have a substituent, and (D1)

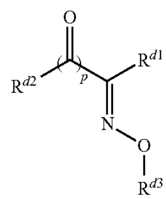

wherein in the formula (D1), $R^{d1}$ represents an aliphatic hydrocarbon group having 1 to 10 carbon atoms which may have a substituent or a phenyl group which may have a substituent; $R^{d2}$ represents a phenyl group which may have a substituent; $R^{d3}$ represents a hydrogen atom or a group represented by —CO—$R^{d5}$; $R^{d5}$ represents an alkyl group having 1 to 6 carbon atoms or an aryl group which may have a substituent; and p represents 0 or 1.

14. An adhesive which is formed of the curable composition according to claim 13.

15. A method of producing a fiber-reinforced composite material, comprising curing the curable composition according to claim 13, which is impregnated into reinforced fibers, by heating.

16. A fiber-reinforced composite material comprising a matrix formed of a cured material of the curable composition according to claim 13; and reinforced fibers.

* * * * *